US012306940B2

(12) United States Patent
Huang et al.

(10) Patent No.: US 12,306,940 B2
(45) Date of Patent: May 20, 2025

(54) METHODS AND APPARATUS TO IMPLEMENT TRUSTED TRANSFER LEARNING ON TRANSFORMER-BASED PHISHING DETECTION

(71) Applicant: McAfee, LLC, San Jose, CA (US)

(72) Inventors: Yonghong Huang, Portland, OR (US); Steve Grobman, Plano, TX (US); John Wagener, St. Paul, MN (US)

(73) Assignee: McAfee, LLC, San Jose, CA (US)

( * ) Notice: Subject to any disclaimer, the term of this patent is extended or adjusted under 35 U.S.C. 154(b) by 246 days.

(21) Appl. No.: 17/941,919

(22) Filed: Sep. 9, 2022

(65) Prior Publication Data

US 2024/0095356 A1 Mar. 21, 2024

(51) Int. Cl.
*G06F 21/00* (2013.01)
*G06F 21/56* (2013.01)

(52) U.S. Cl.
CPC ........ *G06F 21/56* (2013.01); *G06F 2221/034* (2013.01)

(58) Field of Classification Search
CPC ............................ G06F 21/56; G06F 2221/034
See application file for complete search history.

(56) References Cited

U.S. PATENT DOCUMENTS

| 11,444,978 | B1 * | 9/2022 | Liao | ........................ | G06F 40/30 |
| 2021/0295822 | A1 * | 9/2021 | Tomkins | ............. | G06F 16/3338 |
| 2022/0094713 | A1 * | 3/2022 | Lee | ....................... | G06F 18/214 |

OTHER PUBLICATIONS

Conneau et al., "Unsupervised Cross-lingual Representation Learning at Scale," Proceedings of the 58th Annual Meeting of the Association for Computational Linguistics, pp. 8440-8451, dated Jul. 5-10, 2020, 12 pages.
Devlin et al., "BERT: Pre-training of Deep Bidirectional Transformers for Language Understanding," dated May 24, 2019, Proceedings of NAACL-HLT 2019, 16 pages.
Van der Maaten, "Visualizing Data using t-SNE," dated Nov. 8, 2008, Journal of Machine Learning Research 9 (2008) 2579-2605, 27 pages.
Sun et al., "MobileBERT: a Compact Task-Agnostic BERT for Resource-Limited Devices," arXiv:2004.02984 [cs.CL], submitted Apr. 6, 2020, retrieved from [https://arxiv.org/abs/2004.02984] on Jul. 21, 2022, 13 pages.

* cited by examiner

*Primary Examiner* — Ghazal B Shehni
(74) *Attorney, Agent, or Firm* — HANLEY, FLIGHT & ZIMMERMAN, LLC

(57) ABSTRACT

Methods, apparatus, systems, and articles of manufacture are disclosed to implement trusted transfer learning on transformer-based phishing detection. In some examples, an apparatus includes processor circuitry to perform instructions to instantiate circuitry. The instantiated circuitry provides a uniform resource locator (URL) matrix corresponding to at least a portion of a URL address to a first transformer model and provide a web content data matrix corresponding to web content data on a web page at the URL address to a second transformer model. The instantiated circuitry performs data fusion on a first output from the first transformer model and a second output from the second transformer model to create a combined result. The instantiated circuitry determines at least whether phishing is detected at the URL address based at least in part on the combined result.

25 Claims, 12 Drawing Sheets

METHODS AND APPARATUS TO IMPLEMENT TRUSTED TRANSFER LEARNING ON TRANSFORMER-BASED PHISHING DETECTION

FIELD OF THE DISCLOSURE

This disclosure relates generally to phishing detection and, more particularly, to trusted transfer learning on transformer-based phishing detection.

BACKGROUND

In recent years, phishing attacks have become one of the most prominent attacks against individual Internet users, governments, and service-providing organizations. In a phishing attack, attackers create websites by copying legitimate websites and then send the malicious uniform resource locators (URLs) to targeted victims using spam messages, texts, or social networks. Through a phishing attack, attackers collect sensitive information from victims such as banking accounts, social security numbers, and login credentials.

BRIEF DESCRIPTION OF THE DRAWINGS

In general, the same reference numbers will be used throughout the drawing(s) and accompanying written description to refer to the same or like parts.

Figure 1:
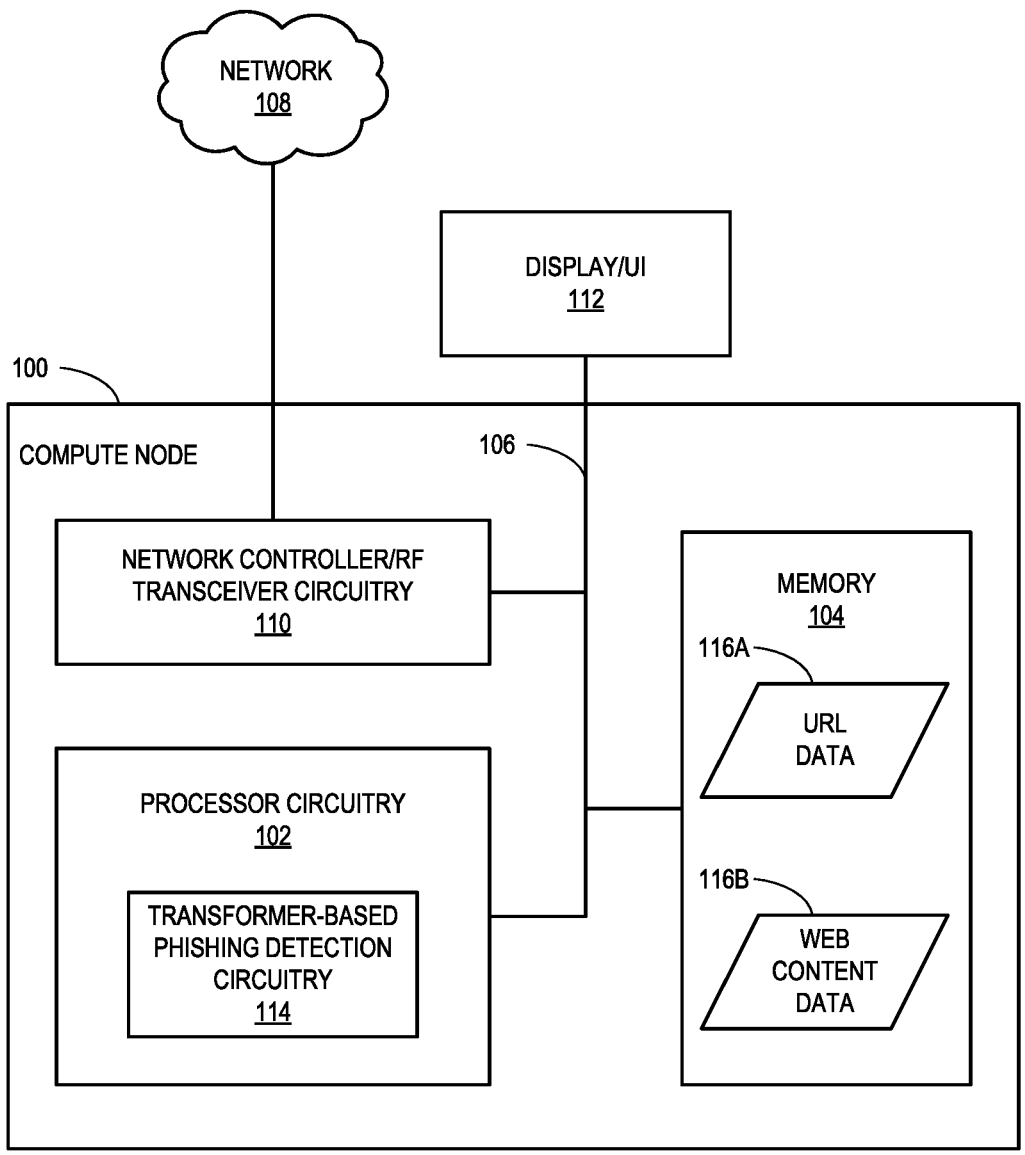
FIG. 1 is an illustration of an example compute node implementing trusted transfer learning for transformer-based phishing detection.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Effective phishing detection introduces several key challenges, including the dynamic (e.g., changing) aspect of contents in a phishing attack, the short life span of malicious sites that are the sources of such attacks, and a lack of updated training samples to train a model designed to detect phishing.

Traditional phishing detection methods include maintaining an allowed list of websites and a blocked list of websites, including rule-based blocking methods in browsers and email applications, as well as some machine learning methods. Allowed list and blocked list methods can be applied in a cross-platform environment and can theoretically achieve minimal false positive (FP) classifications and minimal false negative classifications (FN), however, they have limited capabilities of preventing new attacks from sources that are not in the lists. Rule-based methods include signature-based determinations and also may achieve minimal FPs and FNs, but also have no way of preventing new attacks, similar to the limitations of allowed lists and blocked lists.

Machine learning approaches can scale and generalize to new attacks, but without a very large number of training samples, they can be inhibited from effective prevention with high FPs and FNs. Most machine learning techniques use nature language processing (NLP) approaches and meta data, which relies on third-party services. Signature-based approaches and traditional machine learning approaches use feature engineering that depends on domain knowledge from security researchers. Deep learning approaches that have been applied to phishing detection use convolutional neural networks (CNNs) or recurrent neural networks (RNNs) to learn uniform resource locator (URL) address strings or the contents of web pages at URL addresses. CNNs and RNNs do not require feature engineering and third party input, however, CNNs and RNNs require large scale data to train models from scratch in order to have good generalization of training across a wide range of URL addresses and web content data. Thus, CNNs and RNNs are not effective at detecting zero-day attacks (e.g., attacks that exploit a vulnerability before a software vendor has become aware of it) and are also not effective at generalizing across languages.

Transformers are a more recent type of deep learning architecture that have shown superior performance in multiple natural language processing (NLP) tasks including content comprehension over other NLP solutions. The attention mechanism within a transformer provides an approach to allow a machine-learning model to focus on the relevant parts of an input sequence (e.g., a sequence of words, such as a phrase or sentence) and calculates the relationship of each object/word/portion of the input sequence to each of the other objects/words/portions of the input sequence. For example, a pronoun may be more related to the noun it refers to than to a preposition in a sentence. Some key features of transformers over other deep learning and traditional machine learning approaches to phishing detection are transfer learning using pre-trained models, zero-shot capability, and cross-lingual capability. Therefore large-scale datasets of training samples may not be needed when employing transformers.

Examples disclosed herein provide trusted transfer learning on transformer-based phishing detection. Examples disclosed herein are initially implemented as two versions of a large pre-trained neural network model, such as BERT (Bidirectional Encoder Representations from Transformers). In some examples, the pre-trained model may be an extension of BERT, such as BERT/XLM (e.g., BERT with cross-lingual language model pre-training). In some examples, another pre-trained model may be utilized. The BERT and BERT/XLM pre-training models, among others, were trained with very extensive data sets. In some examples, the first version of the model is fine-tuned for phishing detection utilizing a training data set of URL addresses (or portions of URL addresses). In some examples, the second version of the model is fine-tuned for phishing detection utilizing a training data set of web content data (e.g., data within webpages such as sentences and phrases that correspond to the content on the webpage).

Examples disclosed herein apply the fine-tuned training URL address version of the model and the fine-tune trained web content data version of the model on data received from a web site (e.g., the data may be the URL address of the website and/or the web content data on the page(s) of the website). In some examples, the URL address is fed through the URL address version of the model to determine if phishing is detected related to the URL address. In some examples, the web content data is fed through the web content data version of the model to determine if phishing is detected related to the web content data on the page(s) of the website. In some examples, the output (e.g., detection results) from each of the two models is then passed through a data fusion process to create a combined result corresponding to both the URL address and the web content data. Examples, disclosed herein determine whether the combined result indicates that phishing is detected at the website in question (e.g., the website at the URL address that includes the web content data). In some examples, phishing detection is determined by the combined result being compared against a threshold value (e.g., phishing is detected if the combined result meet or exceeds the threshold value).

Examples disclosed herein provide an indication (e.g., warning) of detected phishing on a user interface. Examples disclosed herein create density plots of a plurality of combined results to visually indicate phishing detection hot spots across a variety of websites.

FIG. 1 is an illustration of an example compute node implementing trusted transfer learning for transformer-based phishing detection. In the illustrated example of FIG. 1, a compute node 100 is shown. The example compute node may be a laptop computer, a desktop computer, a phone, a tablet, a workstation, a server, an embedded computing device, or any other type of computing device that can execute software code. The example compute node 100 includes processor circuitry 102, which may be the same as, similar to, different from, or complementary to processor circuitry 812 in FIG. 8. In some examples, the processor circuitry 102 is communicatively coupled to a memory 104 over an interface 106. The example interface 106 includes interface circuitry to communicatively couple the processor circuitry 102 and the memory 104. The example memory 104 may include dynamic random access memory (DRAM), static random access memory (SRAM), a cache memory, a buffer, non-volatile memory, a storage device, or any one or more other forms of memory that provide data storage. The example interface 106 may include one or more types of interfaces implemented by hardware in accordance with one or more interface standards, such as IEEE (Institute of Electrical and Electronics Engineers) or JEDEC (Joint Electron Device Engineering Council) high speed memory interfaces, a Peripheral Component Interconnect Express (PCIe) interface, or any other interface capable of sending and receiving data between a processor circuitry 102 and a memory 104.

The example compute node 100 is additionally communicatively coupled to a network 108 (e.g., a cloud network) through a network controller and/or RF transceiver circuitry 110. The example network 108 may be any type of network capable of carrying one or more types of network packets between nodes on the network 108, such as compute node 100 and or any one or more other compute nodes, switches, gateways, servers, edge devices, or other end points across the network 108. The example network controller/RF transceiver circuitry 110 translates information from the interface 106 to data packets corresponding one or more network protocols, allowing data to be sent from the compute node 100 across the network 108 as well as received by the compute node 100 from the network 108. In some examples, the processor circuitry 102 is communicatively coupled to the network 108 through the interface 106 and additionally through the network controller and/or RF transceiver circuitry 110 that is also communicatively coupled to the interface 106.

The example compute node 100 is additionally communicatively coupled to a display/user interface (UI) 112. In some examples, the display/UI 112 displays data from the compute node 100 visually to a user. In some examples, the displayed data is received from processor circuitry 102 and/or from other circuitry within the compute node 100.

In some examples, the processor circuitry 102 includes transformer-based phishing detection circuitry 114 to implement phishing detection based on trusted transfer learning in transformer-based models. In some examples, phishing detection is implemented on uniform resource locator (URL) data 116A and/or on web content data 116B that may be stored in the memory 104. In some examples, the compute node 100 receives the URL data 116A and the web content data 116B from the network 108 and stores the URL data 116A and the web content data 116B in the memory 104 to be analyzed for phishing. In some examples, the URL data 116A includes training input data to train a URL address transformer model circuitry 212A (described below in connection with FIG. 2). In some examples, the web content data 116B includes training input data to train a web content data transformer model circuitry 212B (described below in connection with FIG. 2).

Figure 2:
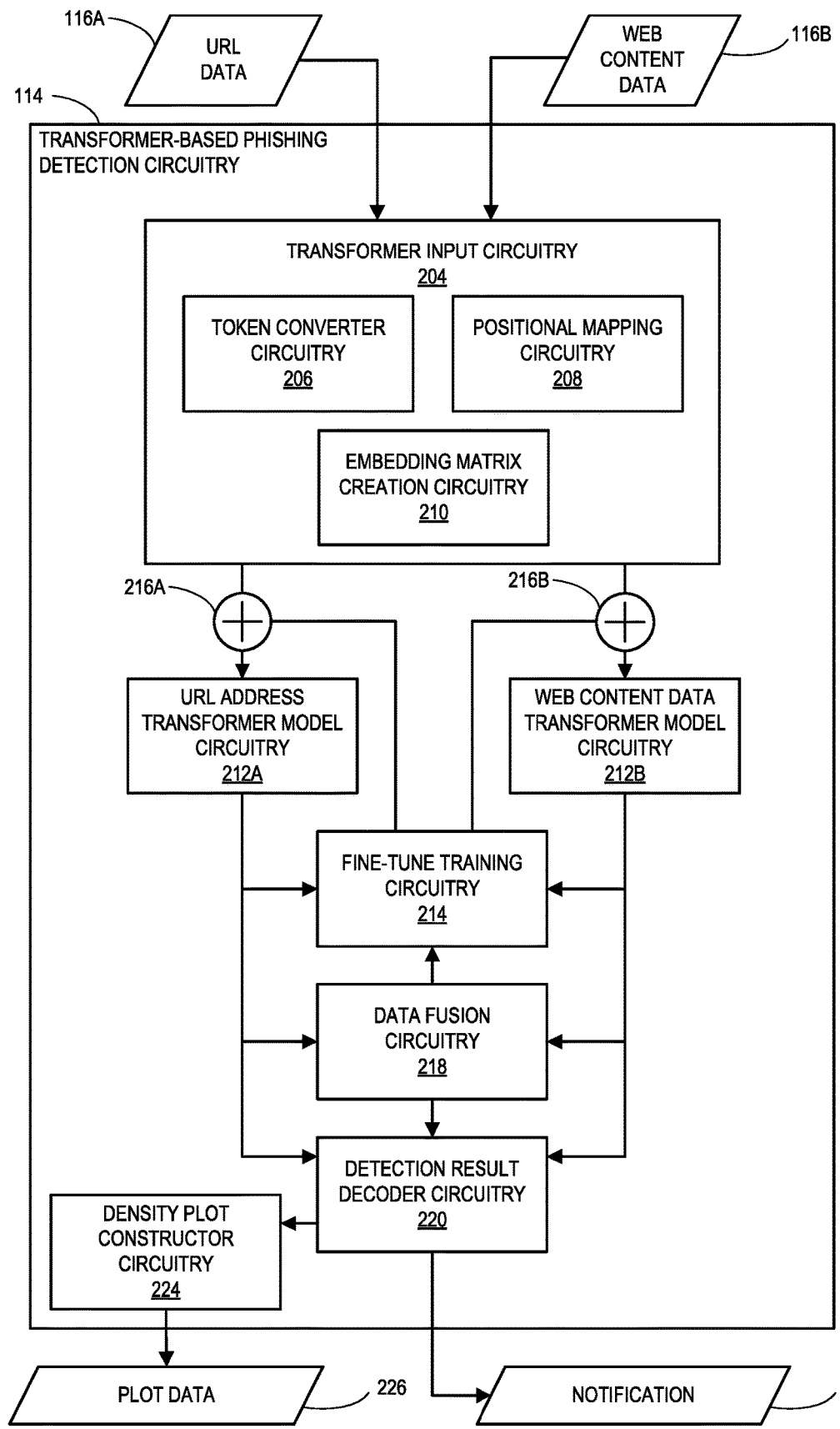
FIG. 2 is a block diagram of an example implementation of the transformer-based phishing detection circuitry of FIG. 1 to implement phishing detection using trusted transfer learning on transformer models.

FIG. 2 is a block diagram of the transformer-based phishing detection circuitry 114 to implement phishing detection using trusted transfer learning on transformer models. The transformer-based phishing detection circuitry 114 of FIG. 2 may be instantiated (e.g., creating an instance of, bring into being for any length of time, materialize, implement, etc.) by processor circuitry such as a central processing unit executing instructions. Additionally or alternatively, the transformer-based phishing detection circuitry 114 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

In some examples, the transformer-based phishing detection circuitry 114 obtains (e.g., receives) URL data 116A and/or web content data 116B. In some examples, the transformer-based phishing detection circuitry 114 obtains the URL data 116A and/or web content data 116B from a memory 104 (FIG. 1) or alternatively received directly from a network 108 (FIG. 1).

In the illustrated example of FIG. 2, the transformer-based phishing detection circuitry 114 includes transformer input circuitry 204. The example transformer input circuitry 204 obtains the URL data 116A and/or web content data 116B and then processes such data with internal circuitries, including example token converter circuitry 206, example positional mapping circuitry 208, and example embedding matrix creation circuitry 210, which are discussed in greater detail below. The example transformer input circuitry 204 creates matrices, from URL data 116A and/or from web content data 116B, for training and/or testing transformer models, such as URL address transformer model circuitry 212A and/or web content data transformer model circuitry 212B.

Figure 4:
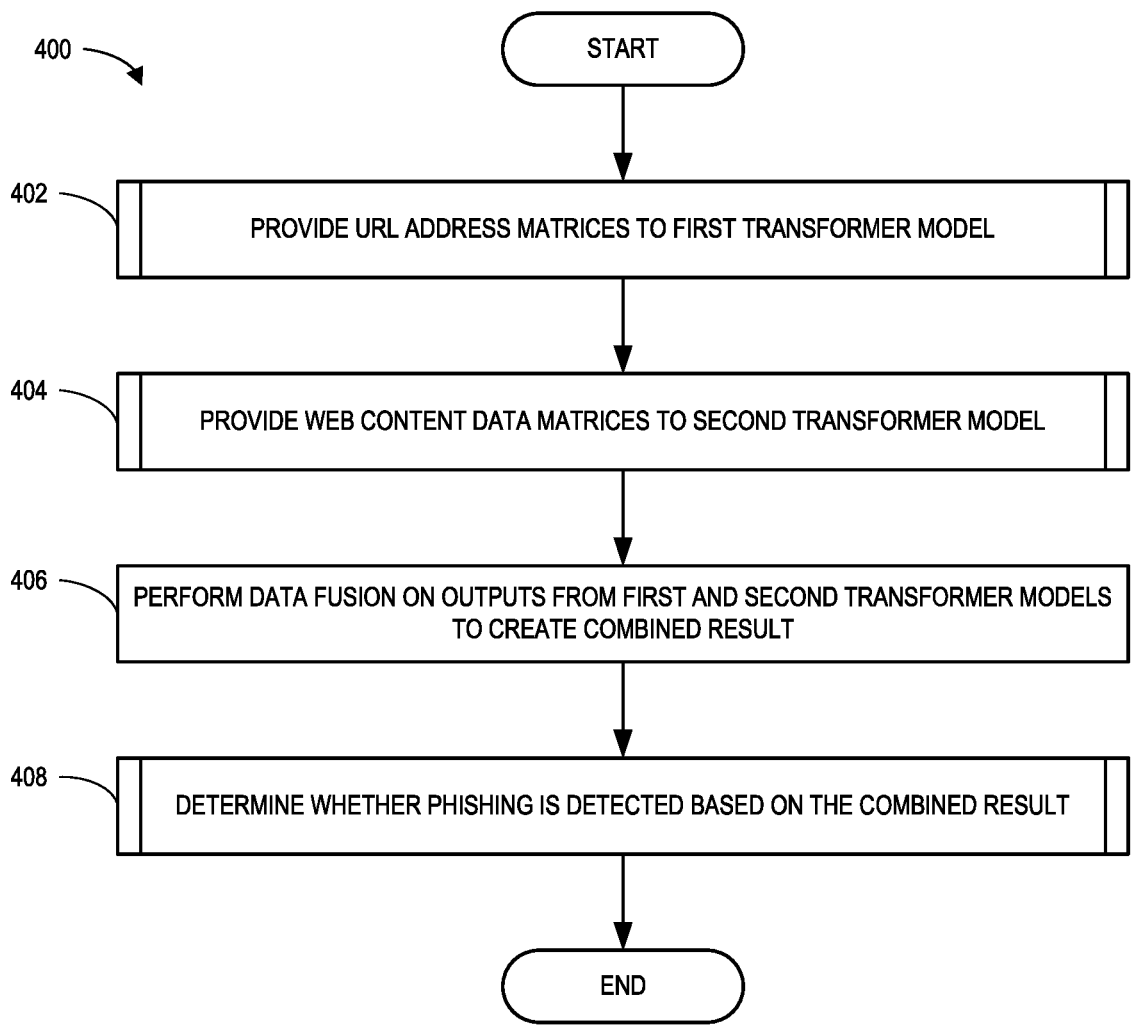
FIG. 4 is a flowchart representative of example machine readable instructions and/or example operations that may be executed by example processor circuitry to implement the transformer-based phishing detection circuitry of FIG. 2.
Figure 5:
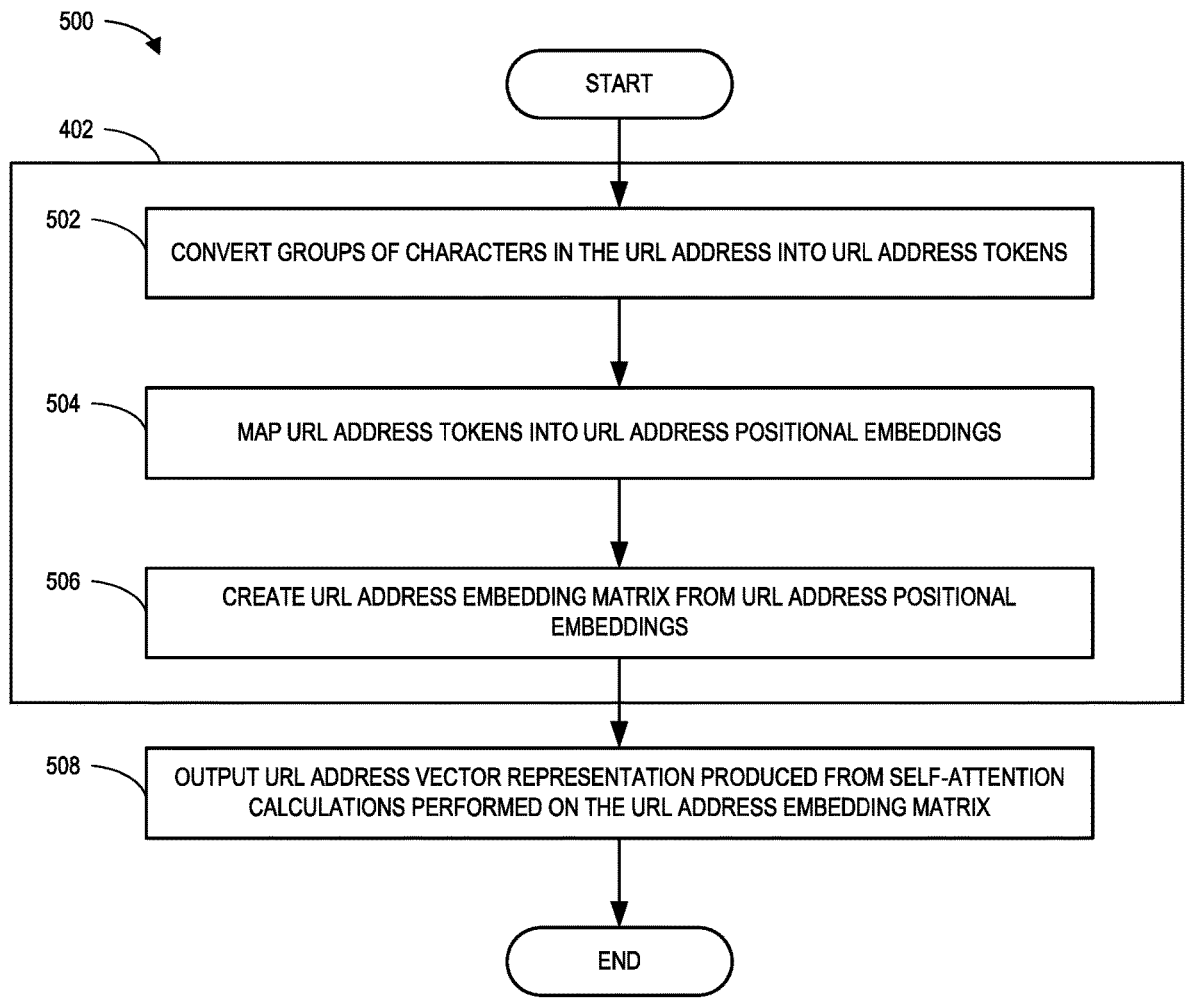
FIG. 5 is a flowchart representative of example machine readable instructions and/or example operations that may be executed and/or instantiated by processor circuitry to create and then encode a URL address embedding matrix.
Figure 6:
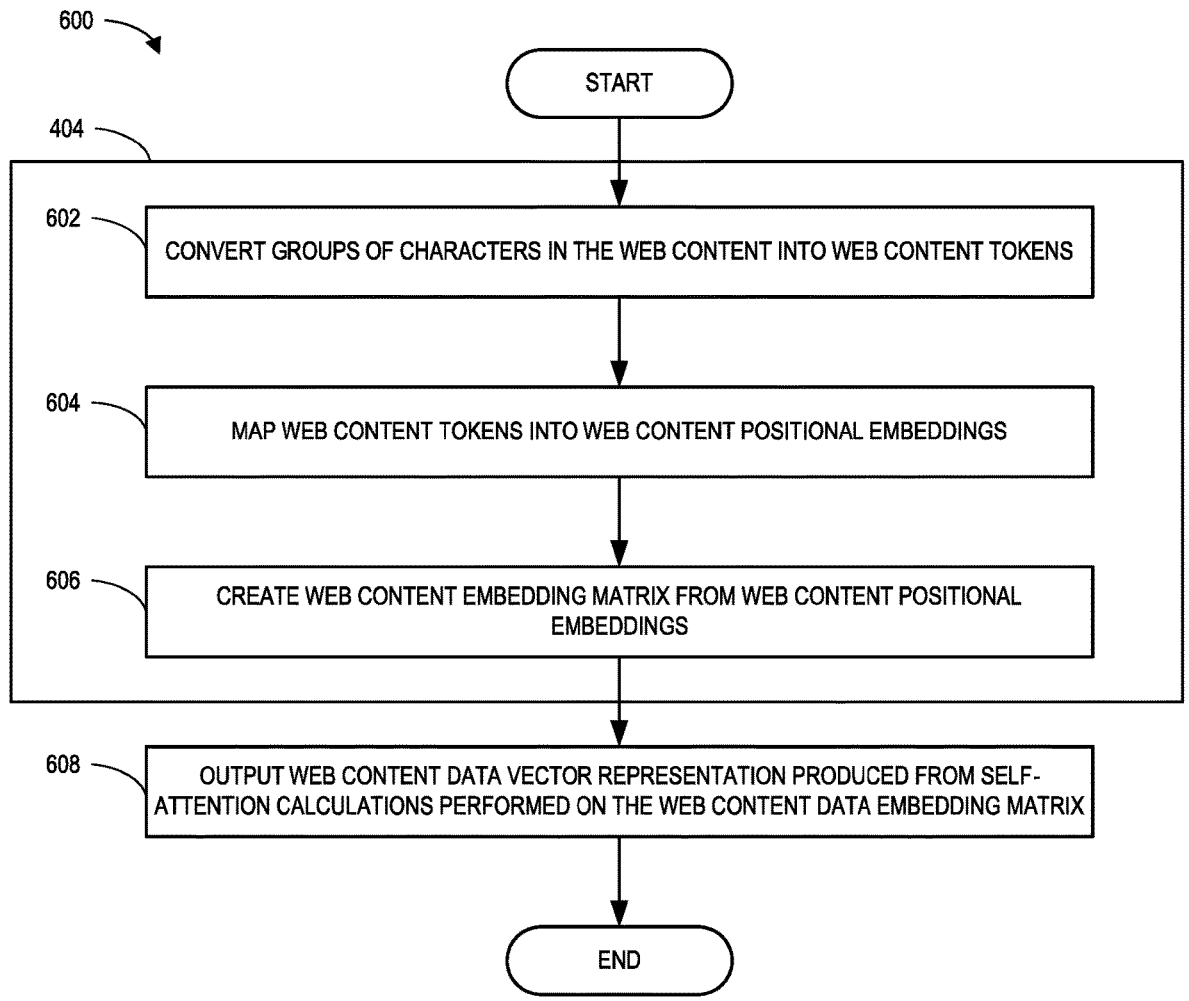
FIG. 6 is a flowchart representative of example machine readable instructions and/or example operations that may be executed and/or instantiated by processor circuitry to create and then encode a web content data embedding matrix.

In some examples, the transformer input circuitry 204 is instantiated by processor circuitry executing tensor creation instructions and/or configured to perform operations such as those represented by the flowchart of FIGS. 4, 5, and 6.

In some examples, the apparatus includes means for creating an input matrix. In some examples, the input matrix is a URL address matrix. In some examples, the input matrix is a web content data matrix. For example, the means for creating may be implemented by transformer input circuitry 204. In some examples, the transformer input circuitry 204 may be instantiated by processor circuitry such as the example processor circuitry 912 of FIG. 9. For instance, the transformer input circuitry 204 may be instantiated by the example microprocessor 1000 of FIG. 10 executing machine executable instructions such as those implemented by at least blocks 402 and 404 of FIG. 4. In some examples, transformer input circuitry 204 may be instantiated by hardware logic circuitry, which may be implemented by an ASIC, XPU, or the FPGA circuitry 1100 of FIG. 11 structured to perform operations corresponding to the machine readable instructions. Additionally or alternatively, the transformer input circuitry 204 may be instantiated by any other combination of hardware, software, and/or firmware. For example, the transformer input circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the transformer-based phishing detection circuitry 114 includes token converter circuitry 206. The example token converter circuitry 206 converts characters into tokens. As used herein, a "token" is one or more characters in a string of text, such as a group of characters, a word, or a sub-word. In some examples, a sub-word may be a portion of a word that can be delineated by a specific number of characters, a syllable, a specific character within a word, or any other method of determining the sub-word. In some examples, a group of characters may be more than one word, portions of more than one word based on character counts, or any other way of determining a group of characters. The token converter circuitry 206 may store a copy of one or more tokens in memory 104 or another memory to keep track of each known token. The tokens may be represented by the characters that are in the token or a numerical representation of such group of one or more characters. Groups of characters can be cross-referenced against their numerical representations by performing a lookup of the representation in a location the characters are stored for reference.

Figure 3:
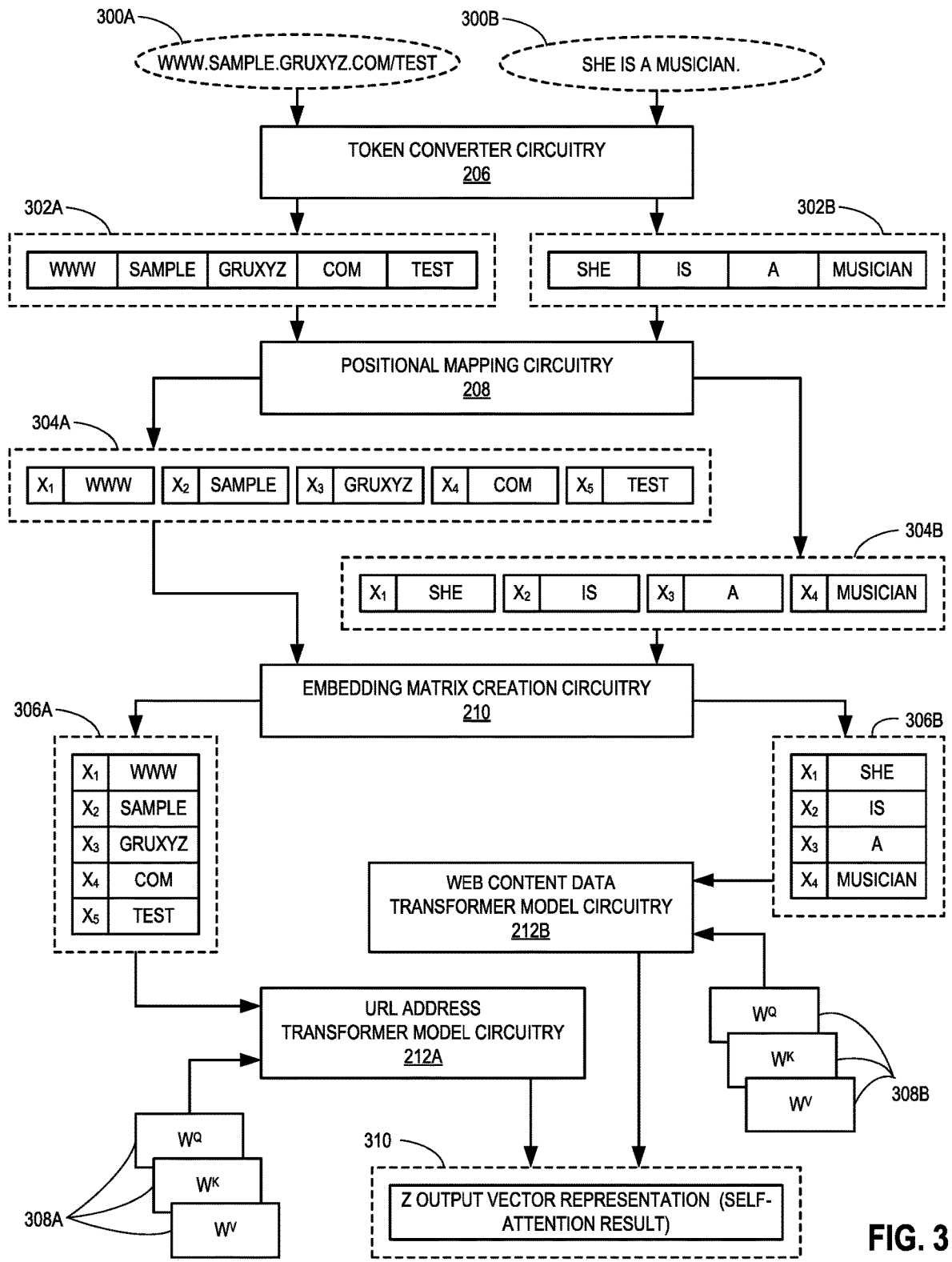
FIG. 3 illustrates an example process that the example transformer input circuitry of FIG. 2 implements to perform phishing detection.

Turning to FIG. 3, an example process the transformer input circuitry 204 performs is illustrated in FIG. 3. For illustrative purposes, data that is created and/or utilized by circuitry shown in FIG. 3 is represented by dashed lines. In some examples, token converter circuitry 206 obtains some URL address data 300A (e.g., the URL www.sample.gru-.com/test). The example token converter circuitry 206 then converts (e.g., tokenizes) the URL address data 300A into a group of one or more tokens. For example, the URL address data 300A is converted into token group 302A that includes tokens 9, SAMPLE, GRUXYZ, COM, and TEST. The example token group 302A was created using a special character partitioner/delimiter, which includes periods (".") and slashes ("/"), among other delimiters. Thus, the token converter circuitry 206 separates the groups of characters into tokens that are between the delimiters.

In some examples, the token converter circuitry 206 is instantiated by processor circuitry executing tensor creation instructions and/or configured to perform operations such as those represented by the flowcharts of FIGS. 5 and 6.

In some examples, the apparatus includes means for converting groups of characters into tokens. In some examples, the groups of characters are URL address characters. In some examples, the groups of characters are web content data characters. For example, the means for converting groups of characters into tokens may be implemented by token converter circuitry 206. In some examples, the token converter circuitry 206 may be instantiated by processor circuitry such as the example processor circuitry 912 of FIG. 9. For instance, the token converter circuitry 206 may be instantiated by the example microprocessor 1000 of FIG. 10 executing machine executable instructions such as those implemented by at least blocks 502 of FIG. 5 and 602 of FIG. 6. In some examples, token converter circuitry 206 may be instantiated by hardware logic circuitry, which may be implemented by an ASIC, XPU, or the FPGA circuitry 1100 of FIG. 11 structured to perform operations corresponding to the machine readable instructions. Additionally or alternatively, the token converter circuitry 206 may be instantiated by any other combination of hardware, software, and/or firmware. For example, the token converter circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for converting includes means for converting groups of URL address characters into tokens. In some examples, the means for converting includes means for converting groups of web content data characters into tokens.

Returning to FIG. 2, in the illustrated example of FIG. 2, the transformer-based phishing detection circuitry 114 includes positional mapping circuitry 208. The example positional mapping circuitry 208 obtains tokens (e.g., converted by token converter circuitry 206) and maps the obtained tokens to a series of positional embeddings. In some examples, a positional embedding is a combination of a positional representation of the location of a given token relative to other tokens in a group of tokens. For example, if a piece of web content data was input as the string "She is a musician" and the token converter circuitry 206 created a group of tokens from the string, including SHE, IS, A, and MUSICIAN, then the positional mapping circuitry 208 may map position representation $X^1$ to SHE to create the first positional embedding of the group (e.g., the word "she" is in the first token position in the group, which the positional representation value $X^1$ signifies). Thus, to complete the positional embeddings, the positional mapping circuitry 208 maps positional representation value $X^2$ to IS to create the second positional embedding, the positional mapping circuitry 208 maps positional representation value $X^3$ to A to create the third positional embedding, and the positional mapping circuitry 208 maps positional representation value $X^4$ to MUSICIAN to create the fourth positional embedding. In some examples, the positional representation values are concatenated to their respective tokens to create the positional embeddings. In some examples, a positional embedding is a vector (e.g., tensor) that includes a positional representation value and a token.

Turning back to the example in FIG. 3, the positional mapping circuitry 208 maps positional representation value $X_1$ to the token 9 to create the first positional embedding, maps positional representation value $X_2$ to the token SAMPLE to create the second positional embedding, maps positional representation value $X_3$ to the token GRUXYZ to create the third positional embedding, maps positional representation value $X_4$ to the token COM to create the fourth positional embedding, and maps positional representation value $X_5$ to TEST to create the fifth positional embedding. In some examples, the group of positional embeddings 304 illustrate all five of the positional embeddings described above. In some examples, to map a positional representation value to a token means to create a vector/tensor that includes both the positional representation value data and the token data. In some examples, the positional representation value data/information may be concatenated in front of or to the end of the token data/information when forming the positional embedding (e.g., the positional embedding vector/tensor).

In some examples, the positional mapping circuitry 208 is instantiated by processor circuitry executing tensor creation instructions and/or configured to perform operations such as those represented by the flowcharts of FIGS. 5 and 6.

In some examples, the apparatus includes means for mapping a token to a positional embedding. In some examples, the token is a URL address token. In some examples, the token is a web content data token. For example, the means for mapping may be implemented by positional mapping circuitry 208. In some examples, the positional mapping circuitry 208 may be instantiated by processor circuitry such as the example processor circuitry 912 of FIG. 9. For instance, the positional mapping circuitry 208 may be instantiated by the example microprocessor 1000 of FIG. 10 executing machine executable instructions such as those implemented by at least blocks 504 of FIG. 5 and 604 of FIG. 6. In some examples, positional mapping circuitry 208 may be instantiated by hardware logic circuitry, which may be implemented by an ASIC, XPU, or the FPGA circuitry 1100 of FIG. 11 structured to perform operations corresponding to the machine readable instructions. Additionally or alternatively, the positional mapping circuitry 208 may be instantiated by any other combination of hardware, software, and/or firmware. For example, the positional mapping circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for mapping includes means for mapping of URL address characters into URL address tokens. In some examples, the means for converting includes means for converting groups of web content data characters into web content data tokens.

In the illustrated example of FIG. 2, the transformer-based phishing detection circuitry 114 includes embedding matrix creation circuitry 210. The example embedding matrix creation circuitry 210 creates a matrix of tensors that represent the group of positional embeddings. In some examples, creating a matrix means creating a multi-dimensional data structure that includes each of the positional embedding tensors. In some examples, the data structure created is one-dimensional tensor that concatenates each of the positional embedding tensors to the others to create a tensor representing all of the positional embeddings.

Turning to FIG. 3, the embedding matrix creation circuitry 210 obtains (e.g., receives) some or all of the positional embeddings in the group of positional embeddings 304A and 304B. The example embedding matrix creation circuitry 210 then creates an embedding matrix. In some examples, the embedding matrix derived from URL data 116A, such as example URL 300A, may be referred to as a URL address (embedding) matrix 306A. In some examples, the embedding matrix derived from web content data 116B, such as example web content data 300B, may be referred to as a web content data (embedding) matrix 306B. The term "embedding" is in parentheses because each of the 306A and 306B matrices are embedding matrices, but for simplicity purposes their names are based on their data types and do not require restating the embedding term. In some examples, the embedding matrix creation circuitry 210 outputs the URL address matrix 306A and sends it as input to the URL address transformer model circuitry 212A. In some examples, the embedding matrix creation circuitry 210 outputs the web content data matrix 306B and sends it as input to the web content data transformer model circuitry 212B. In some examples, an URL address matrix 306A and/or the web content data matrix 306B may be linearly transformed into a vector (e.g., tensor) that represents the URL address matrix 306A or the web content data matrix 306B in a one-dimensional form. In some examples, the URL address matrix 306A may be referred to as an input sequence for the URL address transformer model circuitry 212A. In some examples, the web content data matrix 306B may be referred to as an input sequence for the web content data transformer model circuitry 212B.

In some examples, the embedding matrix creation circuitry 210 is instantiated by processor circuitry executing tensor creation instructions and/or configured to perform operations such as those represented by the flowcharts of FIGS. 5 and 6.

In some examples, the apparatus includes means for creating an embedding matrix. In some examples, the embedding matrix is a URL address matrix. In some examples, the embedding matrix is a web content data matrix. For example, the means for creating may be implemented by embedding matrix creation circuitry 210. In some examples, the embedding matrix creation circuitry 210 may be instantiated by processor circuitry such as the example processor circuitry 912 of FIG. 9. For instance, the embedding matrix creation circuitry 210 may be instantiated by the example microprocessor 1000 of FIG. 10 executing machine executable instructions such as those implemented by at least blocks 506 of FIG. 5 and 606 of FIG. 6. In some examples, embedding matrix creation circuitry 210 may be instantiated by hardware logic circuitry, which may be implemented by an ASIC, XPU, or the FPGA circuitry 1100 of FIG. 11 structured to perform operations corresponding to the machine readable instructions. Additionally or alternatively, the embedding matrix creation circuitry 210 may be instantiated by any other combination of hardware, software, and/or firmware. For example, the embedding matrix creation circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for creating includes means for creating a URL address (embedding) matrix. In some examples, the means for creating includes means for creating a web content data (embedding) matrix.

In the illustrated example of FIG. 2, the transformer-based phishing detection circuitry 114 includes URL address transformer model circuitry 212A and web content data transformer model circuitry 212B. In some examples, the URL address transformer model circuitry 212A and web content data transformer model circuitry 212B are separate transformer models to be trained and tested with separate input data (e.g., 300A and 300B, respectively). In some examples, the models are trained and tested in order for each model to specialize in predicting/determining phishing attempts with different types of data. The example URL address transformer model circuitry 212A is trained to predict/determine phishing attempts based on knowledge of URL addresses where prospective phishing attempts originate. The example web content data transformer model circuitry 212B is trained to predict/determine phishing attempts based on knowledge of web content data (e.g., words, phrases, sentences, etc.) that indicates phishing.

The example URL address transformer model circuitry 212A and web content data transformer model circuitry 212B each are capable of obtaining an embedding matrix from the embedding matrix creation circuitry 210. In some examples, the URL address transformer model circuitry 212A obtains an embedding matrix from the transformer input circuitry 204 when URL data 116A is input into the transformer input circuitry 204. In some examples, the web content data transformer model circuitry 212B obtains an embedding matrix from the transformer input circuitry 204 when web content data 116B is input into the transformer input circuitry 204. Once the embedding matrix is obtained, the example URL address transformer model circuitry 212A or the web content data transformer model circuitry 212B calculates a z output vector representation 310 (e.g., a self-attention result matrix that has been linearly transformed into a vector). In some examples, the z output vector representation 310 is the result of one or more self-attention calculations performed on the embedding matrix. In examples disclosed herein, self-attention means the level of association a single item has to each of a group of items, including itself. For example, if self-attention were calculated for each word in a sentence, certain words may have greater association with other particular words, such as a noun in a sentence and a pronoun in the sentence that refers to the noun, the level of association of those two particular words may be greater than to other words in the sentence. In some examples, self-attention calculates values for the association levels of the items in the group to each other and to themselves.

Turning again to the illustrated example in FIG. 3, the URL address transformer model circuitry 212A may calculate the self-attention of the URL address input 300A (e.g., 9.SAMPLE.GRUXYZ.COM/TEST). As described above, the example URL address input 300A is converted into a URL address matrix 306A, created by the embedding matrix creation circuitry 210. The example URL address transformer model circuitry 212A may determine how much each of the tokens in the URL address input 300A are related to each other and to themselves.

The example web content data transformer model circuitry 212B may calculate the self-attention of the web content data input 300B using a converted web content data matrix 306B corresponding to the 300B data input. For example, the web content data input 300B may be the sentence SHE IS A MUSICIAN. In the self-attention calculations, the web content data transformer model circuitry 212B may determine that the word SHE and the word MUSICIAN are more highly related than the other words to each other because MUSICIAN is descriptive of SHE.

In some examples, the URL address transformer model circuitry 212A and the web content data transformer model circuitry 212B calculates self-attention of each of the positional embeddings in the respective input matrices (e.g., URL address matrix 306A and web content data matrix 306B) by using a query (q), key (k), and value (v) (e.g., "qkv") set of input parameters to calculate self-attention. In some examples, each positional embedding is a row in an embedding matrix. In some examples, the qkv input parameters are a set of weight matrices (e.g., $W_Q$, $W_K$, and $W_V$) that are trained with the transformer model. In some examples, weight matrices 308A are trained for the URL address transformer model circuitry 212A and weight matrices 308B are trained for the web content data transformer model circuitry 212B.

For each element (e.g., positional embedding) in the URL address matrix 306A, the example URL address transformer model circuitry 212A calculates the self-attention of the element against all other elements in the URL address matrix 306A as well as against itself by multiplying the URL address matrix 306A by the $W_Q$, $W_K$, and $W_V$ weight matrices 308A to determine the q, k, and v values that are extracted from the URL address matrix 306A.

For each element (e.g., positional embedding) in the web content data matrix 306B, the example web content data transformer model circuitry 212B calculates the self-attention of the element against all other elements in the web content data matrix 306B as well as against itself by multiplying the web content data matrix 306B by the $W_Q$, $W_K$, and $W_V$ weight matrices 308B to determine the q, k, and v values that are extracted from the web content data matrix 306B.

The example URL address transformer model circuitry 212A and/or the example web content data transformer model circuitry 212B then inputs the determined q, k, and v values into a self-attention equation using the softmax function, Equation 1 below, to calculate the z output vector representation 310 for a given positional embedding from the group of embeddings. In some examples, calculating the z output vector representation 310 from either URL address data 300A or web content data 300B means encoding the created embedding matrices, URL address matrix 306A and web content data matrix 306B, respectively, into a value representing (e.g., a z output vector, a z output tensor, a z output matrix, etc.) how each token in the embedding matrix is related to the other tokens in the same embedding matrix, as well as to itself.

$$SA(z) = \text{softmax}\left(\frac{qk^T}{\sqrt{d_k}}\right)v \quad \text{Equation 1}$$

Self-attention calculation producing a z output vector.

In Equation 1 the self-attention (SA) is computed on a set of queries (q) simultaneously using a dot-product (multiplicative) attention and then multiplied by the set of values (v) to arrive at the self-attention of the input embedding matrix (e.g., the URL address matrix 306A or the web content data matrix 306B), also referred to as the input sequence z (e.g., SA(z)). The input includes a number of dimensions (d) from the input sequence z that is encapsulated in the URL address matrix 306A and/or the web content data matrix 306B. The softmax input includes a scaling factor $$\frac{1}{\sqrt{d_k}}.$$

In some examples, the URL address transformer model circuitry 212A and the web content data transformer model circuitry 212B each have several layers of encoders (e.g., an encoder network) that each calculate the self-attention of one token in the URL address matrix 306A and web content data matrix 306B, respectively (e.g., each encoder in the URL address transformer model circuitry 212A may focus on one row/token of the URL address matrix 306A and each encoder in the web content data transformer model circuitry 212B may focus on one row/token of the web content data matrix 306B). Calculating the self-attention of multiple tokens in parallel is referred to as multi-head self-attention (MSA), an extension of SA. With MSA, the example URL address transformer model circuitry 212A and/or the example web content data transformer model circuitry 212B will execute k self-attention operations in parallel and project the concatenated inputs. In some examples, MSA may capture a plurality of complex, attention-based functions. In some examples, the URL address transformer model circuitry 212A and/or the web content data transformer model circuitry 212B calculates MSA using Equation 2 below.

$$MSA(z)=[SA_1(z);SA_2(z); \ldots ;SA_k(z)] \quad \text{Equation 2. MSA calculation.}$$

In Equation 2 above, the multi-headed self-attention of the input sequence z (e.g., MSA(z)) concatenates the k self-attention operation results of the input sequence z into one single z output vector representation 310 that incorporates the self-attention values calculated for each token in the embedding matrix. In some examples, the encoder networks in each of the URL address transformer model circuitry 212A and the web content data transformer model circuitry 212B allow for parallel calculations across attention heads. For example, there may be 12 (or a number greater or less than 12) encoder block circuitries in the encoder network within each of the URL address transformer model circuitry 212A and the web content data transformer model circuitry 212B. In some examples, an attention "head" is a section of circuitry that can calculate an individual attention value for a token (e.g., a tensor row in an embedding matrix).

Each encoder in the network of encoders within the example URL address transformer model circuitry 212A and the example web content data transformer model circuitry 212B pass their output results to a next encoder in the network of encoders, which becomes the input for the next encoder. The final output of the last encoder in the network of encoders is utilized as a self-attention tensor representation, referred to in FIG. 3 as the z output vector representation 310. The z output vector representation 310 represents the self-attention calculation result from the URL address matrix 306A input into the URL address transformer model circuitry 212A or the web content data matrix 306B input into the web content data transformer model circuitry 212B.

In the illustrated example in FIG. 2, the URL address transformer model circuitry 212A and the web content data transformer model circuitry 212B may extract features from the raw data input into the transformer-based phishing detection circuitry 114 (e.g., the raw URL data 116A and the raw web content data 116B). As used herein, a "feature" is an input variable for a predictive machine-learning model, such as the transformer-based machine-learning model illustrated in FIG. 2 that includes the transformer input circuitry 204, the URL address transformer model circuitry 212A, and the web content data transformer model circuitry 212B. For example, the process shown in FIG. 3 begins with raw data input into the transformer model (e.g., the raw URL address 300A and the raw web content data 300B) and the transformer input circuitry 204, the URL address transformer model circuitry 212A, and the web content data transformer model circuitry 212B perform a process that extracts features from the raw data. For example, the 300A raw URL data is sent through process steps that create the example token group 302A, then a set of example URL address positional embeddings 304A, then a URL address matrix 306A, which is then run through URL address transformer model circuitry 212A to create a z output vector representation 310 that includes one or more extracted features from the original raw URL data 300A. This is also done on the web content data side of the process shown in FIG. 3. As a result of the process performed (one or more times) in FIG. 3, a set of features are extracted from the raw data input into the process (e.g., the raw URL data 300A and the raw web content data 300B).

In some examples, the URL address transformer model circuitry 212A and the web content data transformer model circuitry 212B are instantiated by processor circuitry executing tensor creation instructions and/or configured to perform operations such as those represented by the flowchart of FIG. 5.

In some examples, the apparatus includes means for outputting a URL address vector representation. For example, the means for outputting the URL address vector representation may be implemented by URL address transformer model circuitry 212A. In some examples, the URL address transformer model circuitry 212A may be instantiated by processor circuitry such as the example processor circuitry 912 of FIG. 9. For instance, the URL address transformer model circuitry 212A may be instantiated by the example microprocessor 1000 of FIG. 10 executing machine executable instructions such as those implemented by at least blocks 402 of FIG. 4. In some examples, URL address transformer model circuitry 212A may be instantiated by hardware logic circuitry, which may be implemented by an ASIC, XPU, or the FPGA circuitry 1100 of FIG. 11 structured to perform operations corresponding to the machine readable instructions. Additionally or alternatively, the URL address transformer model circuitry 212A may be instantiated by any other combination of hardware, software, and/or firmware. For example, the URL address transformer model circuitry 212A may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for outputting a web content data vector representation. For example, the means for outputting the web content data vector representation may be implemented by web content data transformer model circuitry 212B. In some examples, the web content data transformer model circuitry 212B may be instantiated by processor circuitry such as the example processor circuitry 912 of FIG. 9. For instance, the web content data transformer model circuitry 212B may be instantiated by the example microprocessor 1000 of FIG. 10 executing machine executable instructions such as those implemented by at least blocks 404 of FIG. 4. In some examples, web content data transformer model circuitry 212B may be instantiated by hardware logic circuitry, which may be implemented by an ASIC, XPU, or the FPGA circuitry 1100 of FIG. 11 structured to perform operations corresponding to the machine readable instructions. Additionally or alternatively, the web content data transformer model circuitry 212B may be instantiated by any other combination of hardware, software, and/or firmware. For example, the web content data transformer model circuitry 212B may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the transformer-based phishing detection circuitry 114 includes fine-tune training circuitry 214. The example fine-tune training circuitry 214 trains the URL address transformer model circuitry 212A and the web content data transformer model circuitry 212B by providing each respective model (212A and 212B) a more refined set of training data that is specific to the phishing issue at hand. In some examples, the URL address transformer model circuitry 212A and the web content data transformer model circuitry 212B initially are implemented as a large pre-trained model, such as BERT (Bidirectional Encoder Representations from Transformers). In some examples, the pre-trained model may be an extension of BERT, such as BERT/XLM (e.g., BERT with cross-lingual language model pre-training). In some examples, another pre-trained model may be utilized. The BERT and BERT/XLM pre-training models, among others, were trained with very extensive data sets.

The example fine-tune training circuitry 214 takes a pre-trained model (e.g., BERT/XLM) and performs additional training using task-specific relevant training data to fine-tune the pre-trained model for the task to be performed, which, in this case, involves phishing detection. For example, the URL data 116A may include a set of training data that includes URLs from which phishing originates. The XLM portion of the BERT/XLM model used as a starting point may allow for URLs that include words and/or characters from multiple languages, to provide a more granular set of training samples. Thus, in some examples, the fine-tune training circuitry 214 obtains z output vector representation 310 from the URL address transformer model circuitry 212A or from the web content data transformer model circuitry 212B and feeds the z output vector representation 310 back into the respective transformer models (212A or 212B) for training purposes. Feeding the z output vector representation 310 (e.g., the self-attention results) back into a model may increase accuracy of the phishing detection because certain tokens (e.g., characters, words, etc.) in the URL addresses and/or the web content data may have a higher relationship to one another when phishing is present. In some examples, the fine-tune training circuitry 214 sends the z output vector representation 310 back to a combiner (e.g., a concatenator), 216A or 216B depending on which transformer model the fine-tune training circuitry 214 is training.

In some examples, when training the URL address transformer model circuitry 212A, the fine-tune training circuitry 214 causes the combiner 216A to combine (e.g., concatenates) the URL address matrix 306A from the embedding matrix creation circuitry 210 with the z output vector representation 310 from the URL address transformer model 212A and feeds the combination back into the URL address transformer model circuitry 212A. In some examples, when training the web content data transformer model circuitry 212B, the fine-tune training circuitry 214 causes the combiner 216B to combine (e.g., concatenates) the web content data matrix 306B from the embedding matrix creation circuitry 210 with the z output vector representation 310 from the web content data transformer model 212B and feeds the combination back into the web content data transformer model circuitry 212B.

In some examples, the fine-tune training circuitry 214 trains the URL address transformer model circuitry 212A with the URL address matrix 306A without combination. In some examples, the fine-tune training circuitry 214 trains the web content data transformer model circuitry 212B with the web content data matrix 306B without combination.

In some examples, the fine-tune training circuitry 214 trains each of the URL address transformer model circuitry 212A and the web content data transformer model circuitry 212B with a combined result of the z output vector representations 310 from both the URL address transformer model circuitry 212A and the web content data transformer model circuitry 212B. In such examples, the fine-tune training circuitry 214 collects a fused output from data fusion circuitry 218 (described in detail below) that incorporates both a z output vector representation 310 from the URL address transformer model circuitry 212A and a z output vector representation 310 from the web content data transformer model circuitry 212B. The fine-tune training circuitry 214 then feeds the fused output (e.g., the combined result) back into one or both of the URL address transformer model circuitry 212A and/or the web content data transformer model circuitry 212B for training purposes. In some examples, the fine-tune training circuitry 214 causes such a combined result to additionally be combined with one or both of a URL address matrix 306A and/or a web content data matrix 306B and the result of such a combination is then fed back into one or both of the URL address transformer model circuitry 212A and/or the web content data transformer model circuitry 212B for training purposes.

Figure 8:
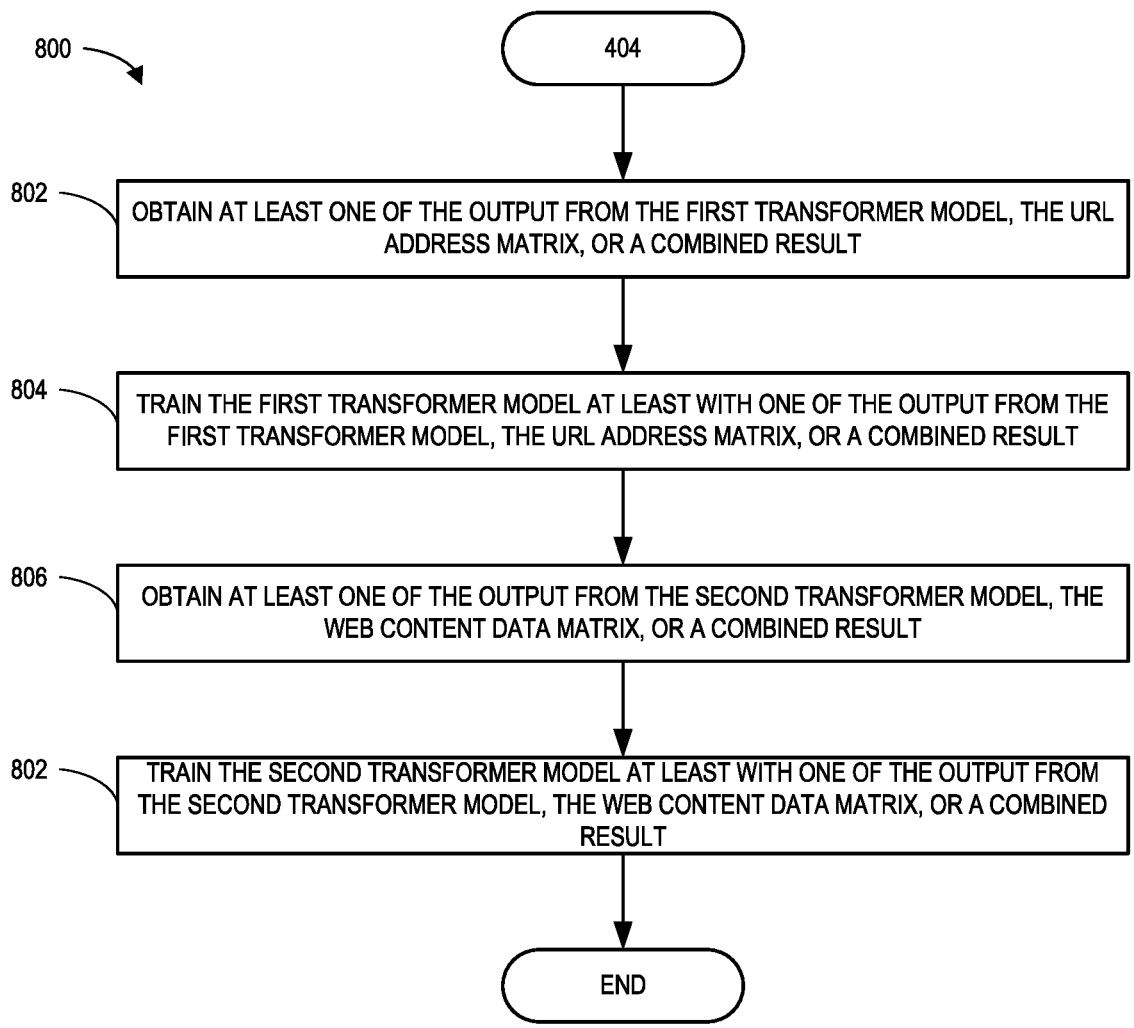
FIG. 8 is a flowchart representative of example machine readable instructions and/or example operations that may be executed and/or instantiated by processor circuitry to train a transformer model.

In some examples, the fine-tune training circuitry 214 is instantiated by processor circuitry executing fine-tune training instructions and/or configured to perform operations such as those represented by the flowchart of FIG. 8.

In some examples, the apparatus includes means for training a transformer model. For example, the means for training may be implemented by fine-tune training circuitry 214. In some examples, the fine-tune training circuitry 214 may be instantiated by processor circuitry such as the example processor circuitry 912 of FIG. 9. For instance, the fine-tune training circuitry 214 may be instantiated by the example microprocessor 1000 of FIG. 10 executing machine executable instructions such as those implemented by at least blocks 802, 804, 806, and 808 of FIG. 8. In some examples, the fine-tune training circuitry 214 may be instantiated by hardware logic circuitry, which may be implemented by an ASIC, XPU, or the FPGA circuitry 1100 of FIG. 11 structured to perform operations corresponding to the machine readable instructions. Additionally or alternatively, the fine-tune training circuitry 214 may be instantiated by any other combination of hardware, software, and/or firmware. For example, the fine-tune training circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for training includes means for obtaining at least one of the output from a transformer model, an embedding matrix (e.g., the URL address matrix 306A and/or the web content data matrix 306B), or a combined result that is the fused vector representation of the z output vector representation 310 from the URL address transformer model circuitry 212A and the z output vector representation 310 from the web content data transformer model circuitry 212B.

In the illustrated example of FIG. 2, the transformer-based phishing detection circuitry 114 includes data fusion circuitry 218. The example data fusion circuitry 218 fuses data using one or more methodologies to provide phishing detection data that may allow for greater accuracy due to cross-correlation of multiple data inputs. For example, the data fusion circuitry 218 may fuse a z output vector representation 310 from the URL address transformer model circuitry 212A and a z output vector representation 310 from the web content data transformer model circuitry 212B into a single combined result. In some examples, the data fusion circuitry 218 may concatenate a z output vector representation 310 from the URL address transformer model circuitry 212A to a z output vector representation 310 from the web content data transformer model circuitry 212B. In some examples, a z output vector representation 310 may have several distinguishable elements within the entire vector that can be separated into portions. Thus, in some examples, the data fusion circuitry 218 may fuse portions of a z output vector representation 310 from the URL address transformer model circuitry 212A to portions of a z output vector representation 310 from the web content data transformer model circuitry 212B. Any other known methods of fusing data may be performed by the example data fusion circuitry 218 to fuse one or more z output vector representations 310 from the URL address transformer model circuitry 212A to one or more z output vector representations 310 from the web content data transformer model circuitry 212B.

In some examples, the data fusion circuitry 218 is instantiated by processor circuitry executing data fusion instructions and/or configured to perform operations such as those represented by the flowchart of FIG. 4.

In some examples, the apparatus includes means for performing data fusion. For example, the means for performing may be implemented by data fusion circuitry 218. In some examples, the data fusion circuitry 218 may be instantiated by processor circuitry such as the example processor circuitry 912 of FIG. 9. For instance, the data fusion circuitry 218 may be instantiated by the example microprocessor 1000 of FIG. 10 executing machine executable instructions such as those implemented by at least block 406 of FIG. 4. In some examples, the data fusion circuitry 218 may be instantiated by hardware logic circuitry, which may be implemented by an ASIC, XPU, or the FPGA circuitry 1100 of FIG. 11 structured to perform operations corresponding to the machine readable instructions. Additionally or alternatively, the data fusion circuitry 218 may be instantiated by any other combination of hardware, software, and/or firmware. For example, the data fusion circuitry 218 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the transformer-based phishing detection circuitry 114 includes detection result decoder circuitry 220. In some examples, the detection result decoder circuitry 220 includes a transformer-based network of decoders to decode the self-attention output from the data fusion circuitry 218. The example detection result decoder circuitry 220 obtains the combined result of the fusion of the z output vector representation 310 from the URL address transformer model circuitry 212A and the z output vector representation 310 from the web content data transformer model circuitry 212B. In some examples, the combined result (e.g., a combined vector representation) is a numerical representation of the self-attention outputs from both the URL address transformer model circuitry 212A and the web content data transformer model circuitry 212B. In some examples, the detection result decoder circuitry 220 may include layers within the decoder network that normalize the combined result (e.g. the combined vector representation) into a value between 0 and 1 to create more manageable values. Any functional layer normalization methodology may be utilized to perform the normalization process. Then, the example detection result decoder circuitry 220 may compare the combined result to a threshold value to determine if the combined result satisfies the threshold value. In some examples, the threshold value also may be a value between 0 and 1. In some examples, the threshold value is determined after an initial amount of training with known phishing candidates to create a value that allows distinguishing results between phishing and non-phishing with the highest possible accuracy. For example, combined results close to 0 may represent URL addresses and web content data that are not related phishing and combined results close to 1 may represent URL addresses and web content data that are related phishing. In such situations, a simple threshold may be 0.5, where combined results that are greater or equal to 0.5 are deemed to detect phishing and combined results that are less than 0.5 are deemed to not detect phishing. In other examples, a threshold greater or less than 0.5 (e.g., 0.3, 0.7, etc.) may be determined to be a more accurate threshold for phishing detection. Thus, in some examples, if the combined result satisfies (e.g., meets, exceeds, etc.) the threshold value, then the detection result decoder circuitry 220 determines that phishing is detected, otherwise the detection result decoder circuitry 220 determines that phishing is not detected.

In some examples, additional thresholds are utilized that classify the combined results into more than two categories. For example, there may be a consumer protection classification where a URL address and/or web content data are not actively phishing, but such web sites could still lead to consumer loss due to other reasons. Thus, in some examples, a value of less than 0.3 may be designated as a "safe" website, a value of between 0.3 and 0.6 may be designated as a website where consumer protection is needed even though phishing is not actively occurring, and a value of greater than 0.6 may be designated as an active phishing website.

In some examples, the detection result decoder circuitry 220 decodes the self-attention outputs (e.g., the z output vector representations 310) directly from the URL address transformer model circuitry 212A and from the web content data transformer model circuitry 212B, where phishing may be individually detected using just one of a URL address or some amount of web content data.

In some examples, the detection result decoder circuitry 220 provides a notification 222 of phishing to a user interface for a user to be notified in the event that phishing has been detected (e.g., the combined result has satisfied the threshold value).

In some examples, the detection result decoder circuitry 220 is a classifier. As used herein, a "classifier" is logic that automatically orders or categorizes data into one or more sets of classes. For example, the detection result decoder circuitry 220 may classify fused/combined data output from the data fusion circuitry 218 as "phishing" or "not phishing." In some examples, the classifier is a neural network (NN) classifier, a support vector machine (SVM) classifier, or one or more other types of classifiers. For example, when the transformer-based phishing detection circuitry 114 receives/obtains as input both raw URL data 116A and raw web content data 116B, the URL address transformer model circuitry 212A and the web content data transformer model circuitry 212B may be employed as feature extractors of the raw input data (e.g., 116A and 116B). For example, the output of the URL address transformer model circuitry 212A may include one or more URL address features extracted from the raw URL data 116A and the output of the web content data transformer model circuitry 212B may include one or more web content data features extracted from the raw web content data 116B. In some examples, the combined set of extracted URL address and web content data features are provided as input into the data fusion circuitry 218. In some examples, the combined set of extracted URL address and web content data features are then provided to the detection result decoder circuitry 220, which may classify the combined feature set (represented by the z output vector representation(s) 310) as "phishing" or "not phishing."

However, in some examples, instead of using combined URL data and web content data to determine a classification of phishing or not phishing, the transformer-based phishing detection circuitry 114 receives/obtains as input only raw URL data 116A. In these examples, the URL address transformer model circuitry 212A may be employed as an end-to-end classifier. For example, raw data such as URL data 116A is input into the transformer-based phishing detection circuitry 114 and the URL address transformer model circuitry 212A outputs the classification result (e.g., "phishing" or "not phishing"). Additionally or alternatively, in some examples, the transformer-based phishing detection circuitry 114 receives/obtains as input only raw web content data 116B. In these examples, the web content data transformer model circuitry 212B may be employed as an end-to-end classifier. For example, raw data such as web content data 116B is input into the transformer-based phishing detection circuitry 114 and the web content data transformer model circuitry 212B outputs the classification result (e.g., "phishing" or "not phishing"). In examples where one or the other type of data (e.g., URL data 116A or web content data 116B) is used to detect phishing, but not both combined, the detection result decoder circuitry 220 may store and/or pass along the classifier output(s), but does not need to perform the classification.

Figure 7:
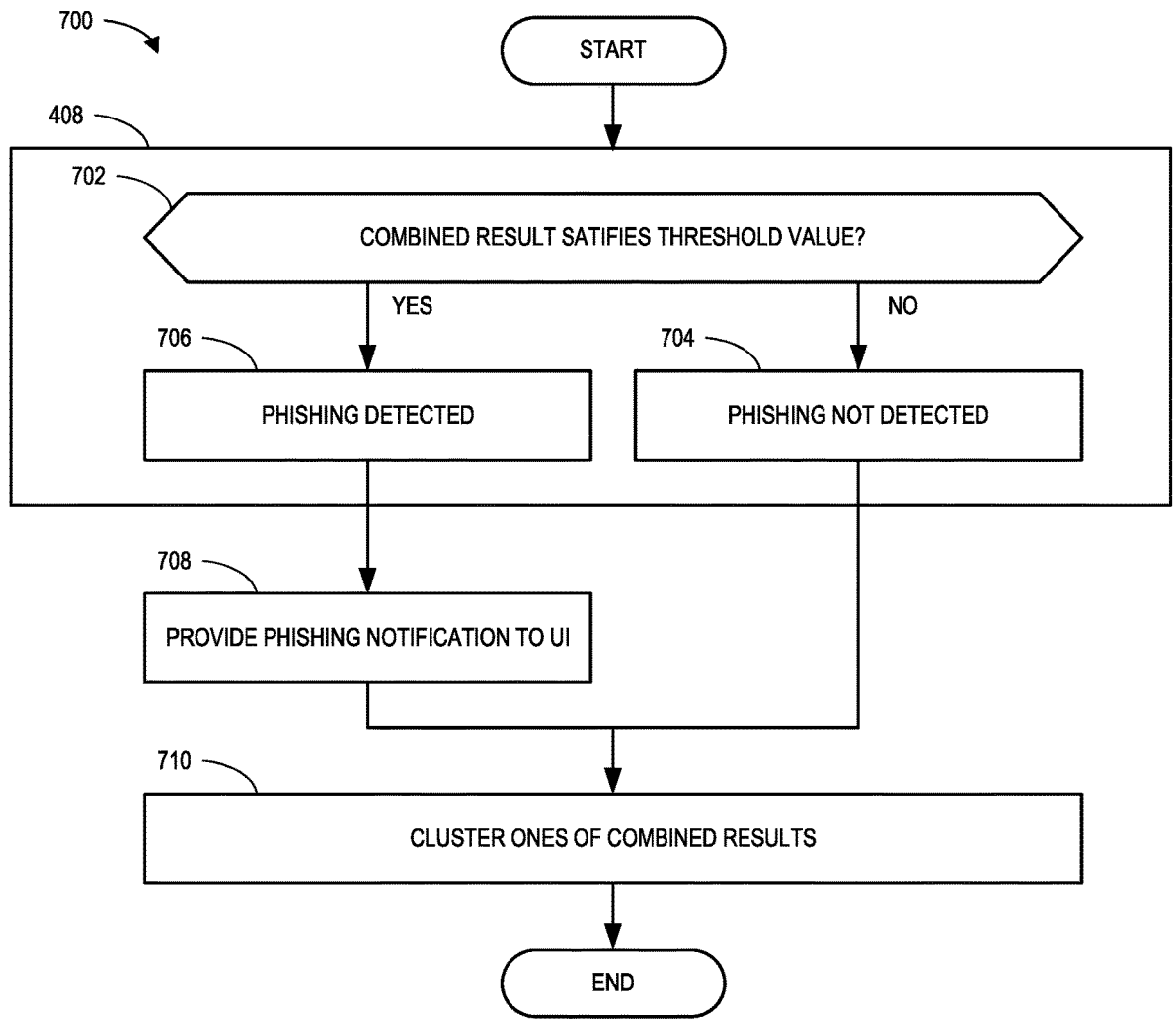
FIG. 7 is a flowchart representative of example machine readable instructions and/or example operations that may be executed and/or instantiated by processor circuitry to determine whether phishing is detected at a website and to notify a user and visually represent the phishing to the user.

In some examples, the detection result decoder circuitry 220 is instantiated by processor circuitry executing detection result instructions and/or configured to perform operations such as those represented by the flowcharts of FIGS. 4 and 7.

In some examples, the apparatus includes means for determining whether phishing is detected. For example, the means for determining may be implemented by detection result decoder circuitry 220. In some examples, the detection result decoder circuitry 220 may be instantiated by processor circuitry such as the example processor circuitry 912 of FIG. 9. For instance, the detection result decoder circuitry 220 may be instantiated by the example microprocessor 1000 of FIG. 10 executing machine executable instructions such as those implemented by at least blocks 408 of FIG. 4 and 702, 704, 706 of FIG. 7. In some examples, the detection result decoder circuitry 220 may be instantiated by hardware logic circuitry, which may be implemented by an ASIC, XPU, or the FPGA circuitry 1100 of FIG. 11 structured to perform operations corresponding to the machine readable instructions. Additionally or alternatively, the detection result decoder circuitry 220 may be instantiated by any other combination of hardware, software, and/or firmware. For example, the detection result decoder circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for determining includes means for comparing a combined result to a threshold value (block 702 of FIG. 7). In some examples, the means for determining includes means for providing a phishing notification to a user interface (block 708 of FIG. 7).

In some examples, the z output vector representation 310 output from the URL address transformer model circuitry 212A is a feature extractor from raw URL addresses (e.g., 300A) and the z output vector representation 310 output from the web content data transformer model circuitry 212B is a feature extractor from raw web content data (e.g., 300B).

In the illustrated example of FIG. 2, the transformer-based phishing detection circuitry 114 includes a density plot constructor circuitry 224. In some examples, the density plot constructor circuitry 224 prepares visual plot data 226 to display for a user. In some examples, the visual plot data may include a multi-dimensional t-distributed stochastic neighbor embedding density plot to provide a visual indication of the phishing detection capabilities of the transformer-based phishing detection circuitry 114. The example density plot constructor circuitry 224 obtains (e.g., receives from other circuitries) one or more of URL data 116A, web content data 116B, the z output vector representation 310 from the URL address transformer model circuitry 212A, the z output vector representation 310 from the web content data transformer model circuitry 212B, and/or the combined results from the data fusion circuitry 218 to use for density plot construction purposes. For example, the density plot constructor circuitry 224 may cluster combined results from the data fusion circuitry 218 (e.g., the fused outputs of the URL address transformer model circuitry 212A and the web content data transformer model circuitry 212B) into a multi-dimensional t-distributed stochastic neighbor embedding density plot. In some examples, the density plots may distinguish different categories of websites (e.g., URL addresses and/or web content data) such as safe websites, consumer protection websites, and active phishing websites.

In some examples, the density plot constructor circuitry 224 is instantiated by processor circuitry executing token converter instructions and/or configured to perform operations such as those represented by the flowchart of FIG. 7.

In some examples, the apparatus includes means for clustering combined results. For example, the means for clustering may be implemented by density plot constructor circuitry 224. In some examples, the density plot constructor circuitry 224 may be instantiated by processor circuitry such as the example processor circuitry 912 of FIG. 9. For instance, the density plot constructor circuitry 224 may be instantiated by the example microprocessor 1000 of FIG. 10 executing machine executable instructions such as those implemented by at least block 710 of FIG. 7. In some examples, the density plot constructor circuitry 224 may be instantiated by hardware logic circuitry, which may be implemented by an ASIC, XPU, or the FPGA circuitry 1100 of FIG. 11 structured to perform operations corresponding to the machine readable instructions. Additionally or alternatively, the density plot constructor circuitry 224 may be instantiated by any other combination of hardware, software, and/or firmware. For example, the density plot constructor circuitry 224 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the transformer-based phishing detection circuitry 114 is illustrated in FIG. 2, one or more of the elements, processes, and/or devices illustrated in FIG. 2 may be combined, divided, re-arranged, omitted, eliminated, and/or implemented in any other way. Further, the example transformer input circuitry 204, the example token converter circuitry 206, the example positional mapping circuitry 208, the example embedding matrix creation circuitry 210, the example URL address transformer model circuitry 212A, the example web content data transformer model circuitry 212B, the example fine-tune training circuitry 214, the example data fusion circuitry 218, the example detection result decoder circuitry 220, the example density plot constructor circuitry 224, and/or, more generally, the example transformer-based phishing detection circuitry 114 of FIG. 2, may be implemented by hardware alone or by hardware in combination with software and/or firmware. Thus, for example, any of the example transformer input circuitry 204, the example token converter circuitry 206, the example positional mapping circuitry 208, the example embedding matrix creation circuitry 210, the example URL address transformer model circuitry 212A, the example web content data transformer model circuitry 212B, the example fine-tune training circuitry 214, the example data fusion circuitry 218, the example detection result decoder circuitry 220, the example density plot constructor circuitry 224, and/or, more generally, the example transformer-based phishing detection circuitry 114, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device (s) (FPLD(s)) such as Field Programmable Gate Arrays (FPGAs). Further still, the example transformer-based phishing detection circuitry 114 may include one or more elements, processes, and/or devices in addition to, or instead of, those illustrated in FIG. 2, and/or may include more than one of any or all of the illustrated elements, processes and devices.

A flowchart representative of example hardware logic circuitry, machine readable instructions, hardware implemented state machines, and/or any combination thereof for implementing the transformer-based phishing detection circuitry 114 of FIG. 2 is shown in FIG. 4. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example transformer-based phishing detection circuitry 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc.

For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read-only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to implement multiple transformer models to detect phishing through data fusion. The machine readable instructions and/or the operations 400 of FIG. 4 begin at block 402, at which the example transformer input circuitry 204 provides URL address matrices to a first transformer model. In some examples, a URL address matrix 306A corresponds to at least a portion of a URL address. In some examples, the first transformer model is instantiated as URL address transformer model circuitry 212A.

At block 404, the example transformer input circuitry 204 provides web content data matrices to a second transformer model. In some examples, a web content data matrix 306B corresponds to at least a portion of the content data in a webpage. In some examples, the second transformer model is instantiated as web content data transformer model circuitry 212B.

At block 406, the example data fusion circuitry 218 performs data fusion on an output from the first transformer model and an output from the second transformer model to create a combined result. In some examples, the output from each of the first and second transformer models is a z output vector representation 310 that corresponds to one or more self-attention calculation results performed on one or both of the URL address matrix 306A and/or the web content data matrix 306B. In some examples, the data fusion circuitry 218 concatenates a z output vector representation 310 output from the URL address transformer model circuitry 212A with a z output vector representation 310 output from the web content data transformer model circuitry 212B.

At block 408, the example detection result decoder circuitry 220 determines whether phishing is detected at the URL address based at least in part on the combined result. In some examples, the phishing detection is at least partially determined based on the detection result decoder circuitry 220 decoding a self-attention based numerical representation of the URL address. In some examples, the phishing detection is at least partially determined based on the detection result decoder circuitry 220 decoding a self-attention based numerical representation of the web content data at the URL address. In some examples, the phishing detection is at least partially determined based on the detection result decoder circuitry 220 decoding a fused numerical representation corresponding to the combination of the self-attention based numerical representation of the URL address and the self-attention based numerical representation of the web content data at the URL address.

FIG. 5 is a flowchart representative of example machine readable instructions and/or example operations 500 that may be executed and/or instantiated by processor circuitry to create and then encode a URL address embedding matrix. Portions of the machine readable instructions and/or the operations 500 of FIG. 5 (specifically blocks 502, 504, and 506) illustrate a more detailed process flow within block 402 of FIG. 4. The machine readable instructions and/or the operations 500 of FIG. 5 begin at block 502, at which the token converter circuitry 206 converts groups of characters in a URL address into one or more URL address tokens (e.g., 302A). In some examples, the URL address tokens are numerical representations of the groups of characters in the URL address.

At block 504, the positional mapping circuitry 208 maps the URL address tokens into URL address positional embeddings (e.g., 304A).

At block 506, the embedding matrix creation circuitry 210 creates a URL address embedding matrix (e.g., 306A) from the URL address positional embeddings.

At block 508, the URL address transformer model circuitry 212A outputs one or more vector representations corresponding to each of the groups of characters. In some examples, the one or more vector representations are produced from one or more self-attention calculations performed on the URL address embedding matrix.

FIG. 6 is a flowchart representative of example machine readable instructions and/or example operations 600 that may be executed and/or instantiated by processor circuitry to create and then encode a web content data embedding matrix. Portions of the machine readable instructions and/or the operations 600 of FIG. 6 (specifically blocks 602, 604, and 606) illustrate a more detailed process flow within block 404 of FIG. 4. The machine readable instructions and/or the operations 600 of FIG. 6 begin at block 602, at which the token converter circuitry 206 converts groups of characters in the web content data on a webpage at a URL address into one or more web content data tokens (e.g., 302B). In some examples, the web content data tokens are numerical representations of the groups of characters in the corresponding to the web content data.

At block 604, the positional mapping circuitry 208 maps the web content data tokens into web content data positional embeddings (e.g., 304B).

At block 606, the embedding matrix creation circuitry 210 creates a web content data embedding matrix (e.g., 306B) from the web content data positional embeddings.

At block 608, the web content data transformer model circuitry 212B outputs one or more vector representations corresponding to each of the groups of characters. In some examples, the one or more vector representations are produced from one or more self-attention calculations performed on the web content data embedding matrix.

FIG. 7 is a flowchart representative of example machine readable instructions and/or example operations 700 that may be executed and/or instantiated by processor circuitry to determine whether phishing is detected at a website and to notify a user and visually represent the phishing to the user. A portion of the machine readable instructions and/or the operations 700 of FIG. 7 (specifically blocks 702, 704, and 706) illustrate a more detailed process flow within block 408 of FIG. 4. The machine readable instructions and/or the operations 700 of FIG. 7 begin at block 702, at which the detection result decoder circuitry 220 determines whether a combined result satisfies a threshold value. In some examples, the combined result is the fused numerical representation (e.g., in vector form) of a z output vector representation 310 from the URL address transformer model circuitry 212A and a z output vector representation 310 from the web content data transformer model circuitry 212B.

If the combined result does not satisfy the threshold value, then, at block 704, the detection result decoder circuitry 220 determines phishing is not detected.

If the combined result satisfies the threshold value, then, at block 706, the detection result decoder circuitry 220 determines phishing is detected.

If phishing is detected, then at block 708, the detection result decoder circuitry 220 provides a phishing notification 222 to a user interface to notify a user that phishing is present on the website at the URL address. In some examples, the notification 222 may be a visual alert on a display screen the user may view. In some examples, the notification 222 may be any other type of alert to get the attention of the user (e.g., an audible alert, etc.).

At block 710, the density plot constructor circuitry 224 clusters combined results into plot data 226, which may include one or more multi-dimensional t-distributed stochastic neighbor embedding density plots. In some examples, the density plots may be based on a plurality of combined results that satisfied the threshold value and a plurality of combined results that did not satisfy the threshold value, which would allow a user to visually see which combinations of URL addresses and web content data does and does not constitute phishing. In some examples, density plots may be based a plurality of separate results of either z output vector representations 310 from the URL address transformer model circuitry 212A or from the web content data transformer model circuitry 212B. In some examples, the clustered data may then be visually presented to a user with any application capable of visually constructing such density plots in a graphical user interface.

FIG. 8 is a flowchart representative of example machine readable instructions and/or example operations 800 that may be executed and/or instantiated by processor circuitry to train a transformer model. The machine readable instructions and/or the operations 800 of FIG. 8 begin at block 802, at which the example fine-tune training circuitry 214 obtains data to use for training of the first transformer model. In some examples, the first transformer model is instantiated by the URL address transformer model circuitry 212A. In some examples, the obtained data includes one or more of the following: a z output vector representation 310 from the URL address transformer model circuitry 212A, a URL address matrix (e.g., 306A), or a combined result (e.g., the vector representation of the combination of a z output vector representation 310 from the URL address transformer model circuitry 212A and a z output vector representation 310 from the web content data transformer model circuitry 212B).

At block 804, the example fine-tune training circuitry 214 trains the first transformer model with some or all of the obtained data from block 802.

At block 806, the example fine-tune training circuitry 214 obtains data to use for training of the second transformer model. In some examples, the second transformer model is instantiated by the web content data transformer model circuitry 212B. In some examples, the obtained data includes one or more of the following: a z output vector representation 310 from the web content data transformer model circuitry 21BA, a web content data matrix (e.g., 306B), or a combined result (e.g., the vector representation of the combination of a z output vector representation 310 from the URL address transformer model circuitry 212A and a z output vector representation 310 from the web content data transformer model circuitry 212B).

At block 808, the example fine-tune training circuitry 214 trains the second transformer model with some or all of the obtained data from block 806.

Figure 9:
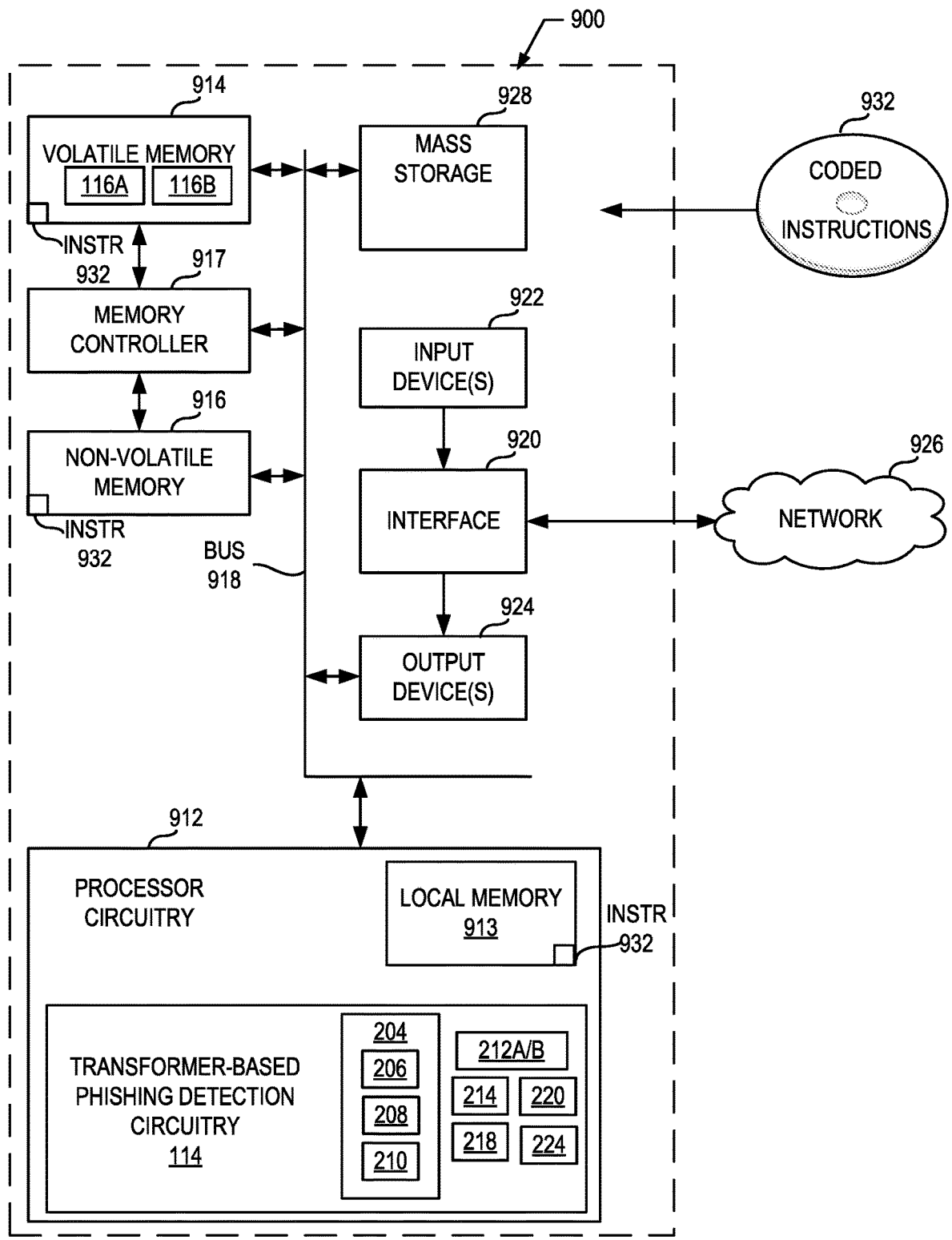
FIG. 9 is a block diagram of an example processing platform including processor circuitry structured to execute the example machine readable instructions and/or the example operations of FIG. 4 to implement the transformer-based phishing detection circuitry of FIG. 2.

FIG. 9 is a block diagram of an example processor platform 900 structured to execute and/or instantiate the machine readable instructions and/or the operations of FIGS. 4-8 to implement the apparatus of FIG. 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements transformer input circuitry 204, token converter circuitry 206, positional mapping circuitry 208, embedding matrix creation circuitry 210, URL address transformer model circuitry 212A, web content data transformer model circuitry 212B, fine-tune training circuitry 214, data fusion circuitry 218, detection result decoder circuitry 220, density plot constructor circuitry 224, and/or, more generally, transformer-based phishing detection circuitry 114.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 932, which may be implemented by the machine readable instructions of FIGS. 4-8, may be stored in the mass storage device 928, in the volatile memory 914, in the non-volatile memory 916, and/or on a removable non-transitory computer readable storage medium such as a CD or DVD.

Figure 10:
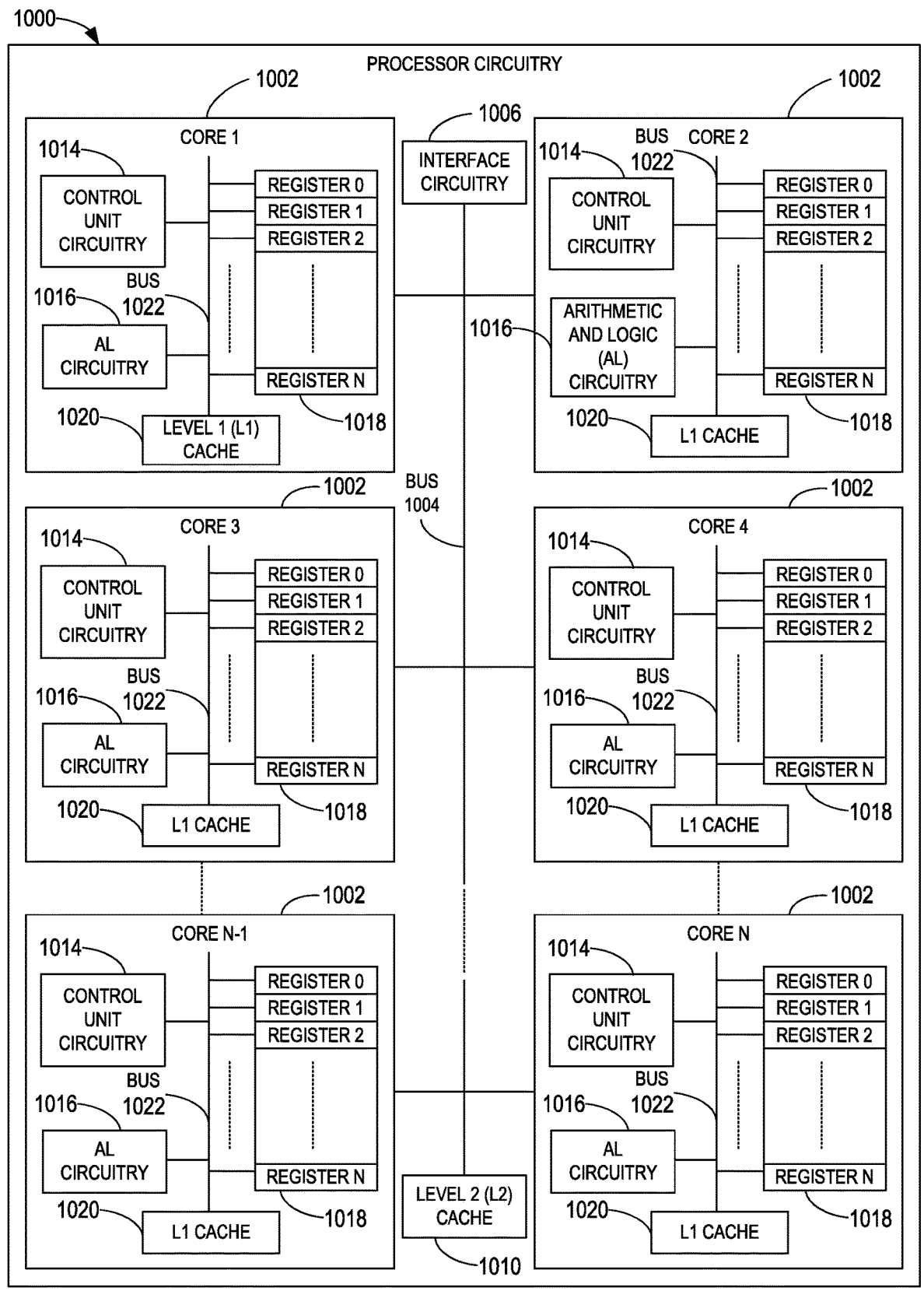
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may be a general purpose microprocessor (e.g., general purpose microprocessor circuitry). The microprocessor 1000 executes some or all of the machine readable instructions of the flowcharts of FIGS. 4-8 to effectively instantiate the circuitry of FIG. 2 as logic circuits to perform the operations corresponding to those machine readable instructions. In some such examples, the circuitry of FIG. 2 is instantiated by the hardware circuits of the microprocessor 1000 in combination with the instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 4-8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
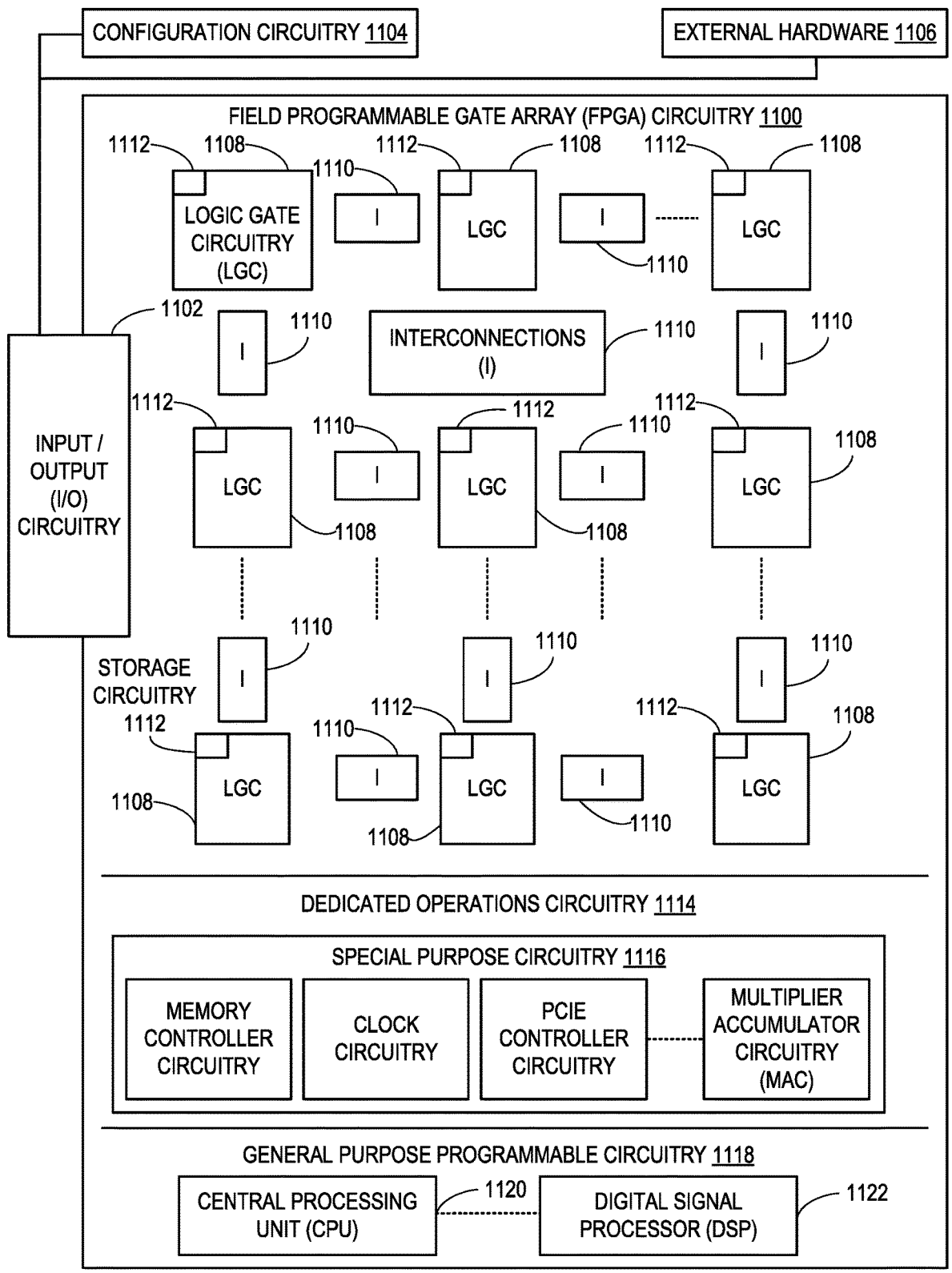
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 4-8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 4-8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 4-8. As such, the FPGA circuitry 1100 may be structured to effectively instantiate some or all of the machine readable instructions of the flowcharts of FIGS. 4-8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 4-8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may be implemented by external hardware circuitry. For example, the external hardware 1106 may be implemented by the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine readable instructions of FIGS. 4-8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 6 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 4-8 may be executed by one or more of the cores 1002 of FIG. 10, a second portion of the machine readable instructions represented by the flowcharts of FIGS. 4-8 may be executed by the FPGA circuitry 1100 of FIG. 11, and/or a third portion of the machine readable instructions represented by the flowcharts of FIGS. 4-8 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
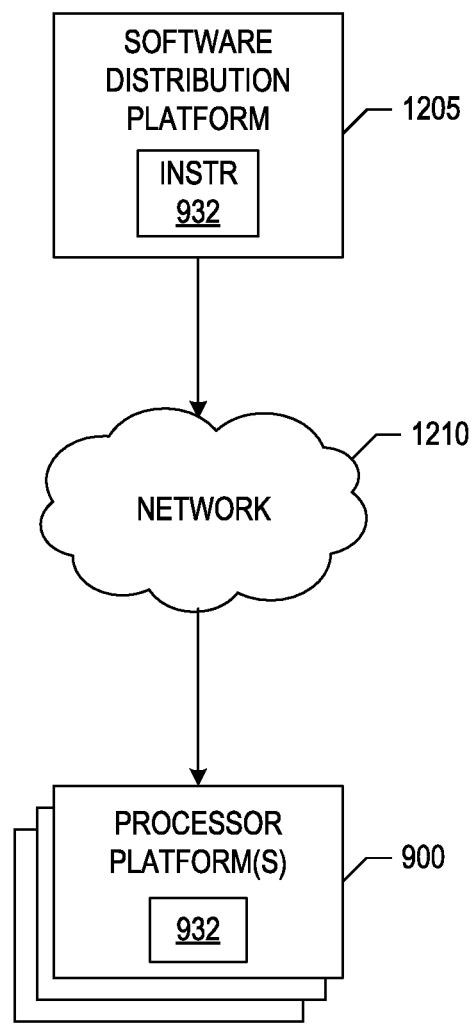
FIG. 12 is a block diagram of an example software distribution platform (e.g., one or more servers) to distribute software (e.g., software corresponding to the example machine readable instructions of FIGS. 4-8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions 400, 800, etc. of FIGS. 4-8, as described above. The one or more servers of the example software distribution platform 1205 are in communication with an example network 1210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions 400, 800, etc. of FIGS. 4-8, may be downloaded to the example processor platform 900, which is to execute the machine readable instructions 932 to implement the transformer-based phishing detection circuitry 114 of FIG. 2. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that implement trusted transfer learning on transformer-based phishing detection. Disclosed systems, methods, apparatus, and articles of manufacture improve the efficiency of using a computing device by providing efficient phishing detection for both URL addresses and web content data. The improved efficiency benefits from small training data sets through the use of transfer learning and data fusion to achieve greater detection accuracy. Density plot visualizations of phishing detection results also provide additional information to reveal problematic websites. Disclosed systems, methods, apparatus, and articles of manufacture are accordingly directed to one or more improvement(s) in the operation of a machine such as a computer or other electronic and/or mechanical device.

Further examples and combinations thereof include the following:

Example 1 includes an apparatus comprising interface circuitry to communicatively couple a processor circuitry to a network, and the processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate transformer input circuitry to provide a uniform resource locator (URL) address matrix corresponding to at least a portion of a URL address to a first transformer model, and provide a web content data matrix corresponding to web content data on a web page at the URL address to a second transformer model, data fusion circuitry to perform data fusion on a first output from the first transformer model and a second output from the second transformer model to create a combined result, and detection result decoder circuitry to determine whether phishing is detected at the URL address based at least in part on the combined result.

Example 2 includes the apparatus of example 1, wherein the first transformer model is fine-tuned for web-address phishing detection and the second transformer model is fine-tuned for web content data phishing detection.

Example 3 includes the apparatus of example 1, wherein the processor circuitry to perform at least one of the first operations, the second operations, or the third operations to instantiate token converter circuitry to convert ones of groups of characters included in the at least portion of the URL address into one or more URL address tokens, positional mapping circuitry to map ones of the one or more URL address tokens into ones of URL address positional embeddings, embedding matrix creation circuitry to create a URL address embedding matrix from the ones of URL address positional embeddings, and URL address transformer model circuitry to output one or more vector representations corresponding to each of the ones of groups of characters, the one or more vector representations produced from one or more self-attention calculations performed on the URL address embedding matrix.

Example 4 includes the apparatus of example 1, wherein the processor circuitry to perform at least one of the first operations, the second operations, or the third operations to instantiate token converter circuitry to convert ones of groups of characters included in the web content data into one or more web content data tokens, positional mapping circuitry to map ones of the one or more web content data tokens into ones of web content data positional embeddings, embedding matrix creation circuitry to create a web content data embedding matrix from the ones of web content data positional embeddings, and web content data transformer model circuitry to output one or more vector representations corresponding to each of the ones of groups of characters, the one or more vector representations produced from one or more self-attention matrix calculations performed on the web content data embedding matrix.

Example 5 includes the apparatus of example 1, wherein the output from the first transformer model is at least a first vector representation including a numerical representation of at least one self-attention calculation of each of one or more groups of characters in the URL address matrix, and wherein the output from the second transformer model is at least a second vector representation including a numerical representation of at least one self-attention calculation of each of one or more groups of characters in the web content data matrix.

Example 6 includes the apparatus of example 5, wherein to perform data fusion further includes the processor circuitry to perform at least one of the first operations, the second operations, or the third operations to instantiate the data fusion circuitry to concatenate the second vector representation to the first vector representation to create the combined result.

Example 7 includes the apparatus of example 6, wherein the processor circuitry to perform at least one of the first operations, the second operations, or the third operations to instantiate fine-tune training circuitry to at least train one of the first or second transformer models with training input data that includes at least one of the first vector representation, the second vector representation, the URL address matrix, the web content data matrix, or the combined result.

Example 8 includes the apparatus of example 1, wherein the combined result is a first combined result, and wherein the processor circuitry to perform at least one of the first operations, the second operations, or the third operations to instantiate density plot constructor circuitry to cluster ones of combined results including the first combined result into at least a multi-dimensional t-distributed stochastic neighbor embedding density plot, the ones of combined results corresponding to ones of outputs of the first transformer model and ones of outputs of the second transformer model.

Example 9 includes the apparatus of example 1, wherein the processor circuitry to perform at least one of the first operations, the second operations, or the third operations to instantiate the detection result decoder circuitry to compare the combined result to a threshold value to determine whether phishing is detected.

Example 10 includes a non-transitory machine readable storage medium comprising instructions that, when executed, cause processor circuitry to at least provide a uniform resource locator (URL) address matrix corresponding to at least a portion of a URL address to a first transformer model, and provide a web content data matrix corresponding to web content data on a web page at the URL address to a second transformer model, perform data fusion on an output from the first transformer model and an output from the second transformer model to create a combined result, and determine at least whether phishing is detected at the URL address based at least in part on the combined result.

Example 11 includes the non-transitory machine readable storage medium of example 10, wherein the first transformer model is fine-tuned for web-address phishing detection and the second transformer model is fine-tuned for web content data phishing detection.

Example 12 includes the non-transitory machine readable storage medium of example 10, comprising instructions that, when executed, cause processor circuitry to at least convert ones of groups of characters included in the at least portion of the URL address into one or more URL address tokens, map ones of the one or more URL address tokens into ones of URL address positional embeddings, create a URL address embedding matrix from the ones of URL address positional embeddings, and output one or more vector representations corresponding to each of the ones of groups of characters, the one or more vector representations produced from one or more self-attention calculations performed on the URL address embedding matrix.

Example 13 includes the non-transitory machine readable storage medium of example 10, comprising instructions that, when executed, cause processor circuitry to at least convert ones of groups of characters included in the web content data into one or more web content data tokens, map ones of the one or more web content data tokens into ones of web content data positional embeddings, create a web content data embedding matrix from the ones of web content data positional embeddings, and output one or more vector representations corresponding to each of the ones of groups of characters, the one or more vector representations produced from one or more self-attention matrix calculations performed on the web content data embedding matrix.

Example 14 includes the non-transitory machine readable storage medium of example 10, wherein the output from the first transformer model is at least a first vector representation including a numerical representation of at least one self-attention calculation of each of one or more groups of characters in the URL address matrix, and wherein the output from the second transformer model is at least a second vector representation including a numerical representation of at least one self-attention calculation of each of one or more groups of characters in the web content data matrix.

Example 15 includes the non-transitory machine readable storage medium of example 14, wherein to perform data fusion includes to concatenate the second vector representation to the first vector representation to create the combined result.

Example 16 includes the non-transitory machine readable storage medium of example 15, comprising instructions that, when executed, cause processor circuitry to at least train at least one of the first or second transformer models with training input data that includes at least one of the first vector representation, the second vector representation, the URL address matrix, the web content data matrix, or the combined result.

Example 17 includes the non-transitory machine readable storage medium of example 10, wherein the combined result is a first combined result, and comprising instructions that, when executed, cause processor circuitry to at least cluster ones of combined results including the first combined result into at least a multi-dimensional t-distributed stochastic neighbor embedding density plot, the ones of combined results corresponding to ones of outputs of the first transformer model and ones of outputs of the second transformer model.

Example 18 includes the non-transitory machine readable storage medium of example 10, comprising instructions that, when executed, cause processor circuitry to at least compare the combined result to a threshold value to determine whether phishing is detected.

Example 19 includes a method, comprising providing a uniform resource locator (URL) address matrix corresponding to at least a portion of a URL address to a first transformer model, and providing a web content data matrix corresponding to web content data on a web page at the URL address to a second transformer model, performing data fusion on an output from the first transformer model and an output from the second transformer model to create a combined result, and determining at least whether phishing is detected at the URL address based at least in part on the combined result.

Example 20 includes the method of example 19, wherein the first transformer model is fine-tuned for web-address phishing detection and the second transformer model is fine-tuned for web content data phishing detection.

Example 21 includes the method of example 19, further including converting ones of groups of characters included in the at least portion of the URL address into one or more URL address tokens, mapping ones of the one or more URL address tokens into ones of URL address positional embeddings, creating a URL address embedding matrix from the ones of URL address positional embeddings, and outputting one or more vector representations corresponding to each of the ones of groups of characters, the one or more vector representations produced from one or more self-attention calculations performed on the URL address embedding matrix.

Example 22 includes the method of example 19, further including converting ones of groups of characters included in the web content data into one or more web content data tokens, mapping ones of the one or more web content data tokens into ones of web content data positional embeddings, creating a web content data embedding matrix from the ones of web content data positional embeddings, and outputting one or more vector representations corresponding to each of the ones of groups of characters, the one or more vector representations produced from one or more self-attention matrix calculations performed on the web content data embedding matrix.

Example 23 includes the method of example 19, wherein the output from the first transformer model is at least a first vector representation including a numerical representation of at least one self-attention calculation of each of one or more groups of characters in the URL address matrix, and wherein the output from the second transformer model is at least a second vector representation including a numerical representation of at least one self-attention calculation of each of one or more groups of characters in the web content data matrix.

Example 24 includes the method of example 23, further including concatenating the second vector representation to the first vector representation to create the combined result.

Example 25 includes the method of example 29, further including comparing the combined result to a threshold value to determine whether phishing is detected.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   interface circuitry to communicatively couple a processor circuitry to a network; and
   the processor circuitry including one or more of:
      at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;
      a field programmable gate array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or
      application specific integrated circuitry (ASIC) including logic gate circuitry to perform one or more third operations;
   the processor circuitry to perform at least one of the first operations, the second operations, or the third operations to instantiate:
      transformer input circuitry to:
         provide a uniform resource locator (URL) address matrix corresponding to at least a portion of a URL address to a first transformer model, the first transformer model to calculate URL address self-attention values of URL address positional embeddings in the URL address matrix; and
         provide a web content data matrix corresponding to web content data on a web page at the URL address to a second transformer model, the second transformer model to calculate web content data self-attention values of web content data positional embeddings in the web content data matrix, the second transformer model different than the first transformer model;
      data fusion circuitry to perform data fusion on a first output from the first transformer model and a second output from the second transformer model to create a combined result; and
      detection result decoder circuitry to determine whether phishing is detected at the URL address based at least in part on the combined result.

2. The apparatus of claim 1, wherein the first transformer model is fine-tuned for web-address phishing detection and the second transformer model is fine-tuned for web content data phishing detection.

3. The apparatus of claim 1, wherein the processor circuitry to perform at least one of the first operations, the second operations, or the third operations to instantiate:
   token converter circuitry to convert ones of groups of characters included in the at least a portion of the URL address into one or more URL address tokens;
   positional mapping circuitry to map ones of the one or more URL address tokens into ones of the URL address positional embeddings;
   embedding matrix creation circuitry to create the URL address matrix from the ones of the URL address positional embeddings; and
   URL address transformer model circuitry to output one or more vector representations corresponding to each of the ones of groups of characters, the one or more vector representations produced from one or more of the URL address self-attention values.

4. The apparatus of claim 1, wherein the processor circuitry to perform at least one of the first operations, the second operations, or the third operations to instantiate:
   token converter circuitry to convert ones of groups of characters included in the web content data into one or more web content data tokens;
   positional mapping circuitry to map ones of the one or more web content data tokens into ones of the web content data positional embeddings;
   embedding matrix creation circuitry to create the web content data matrix from the ones of web content data positional embeddings; and
   web content data transformer model circuitry to output one or more vector representations corresponding to each of the ones of groups of characters, the one or more vector representations produced from one or more of the web content data self-attention values.

5. The apparatus of claim 1, wherein the first output from the first transformer model is at least a first vector representation including the URL address self-attention values of each of one or more groups of characters in the URL address matrix, and wherein the second output from the second transformer model is at least a second vector representation including the web content data self-attention values of each of one or more groups of characters in the web content data matrix.

6. The apparatus of claim 5, wherein to perform data fusion further includes the processor circuitry to perform at least one of the first operations, the second operations, or the third operations to instantiate:
   the data fusion circuitry to concatenate the second vector representation to the first vector representation to create the combined result.

7. The apparatus of claim 6, wherein the processor circuitry to perform at least one of the first operations, the second operations, or the third operations to instantiate:
   fine-tune training circuitry to at least train one of the first or second transformer models with training input data that includes at least one of the first vector representation, the second vector representation, the URL address matrix, the web content data matrix, or the combined result.

8. The apparatus of claim 1, wherein the combined result is a first combined result, and wherein the processor circuitry to perform at least one of the first operations, the second operations, or the third operations to instantiate:
density plot constructor circuitry to cluster ones of combined results including the first combined result into at least a multi-dimensional t-distributed stochastic neighbor embedding density plot, the ones of combined results corresponding to ones of outputs of the first transformer model and ones of outputs of the second transformer model.

9. The apparatus of claim 1, wherein the processor circuitry to perform at least one of the first operations, the second operations, or the third operations to instantiate:
the detection result decoder circuitry to compare the combined result to a threshold value to determine whether phishing is detected.

10. A non-transitory machine readable storage medium comprising instructions that, when executed, cause processor circuitry to at least:
provide a uniform resource locator (URL) address matrix corresponding to at least a portion of a URL address to a first transformer model, the first transformer model to calculate URL address self-attention values for a first URL address matrix element against second URL address matrix elements;
provide a web content data matrix corresponding to web content data on a web page at the URL address to a second transformer model, the second transformer model to calculate web content data self-attention values for a first web content data matrix element against second web content data matrix elements, the second transformer model different than the first transformer model;
perform data fusion on an output from the first transformer model and an output from the second transformer model to create a combined result; and
determine at least whether phishing is detected at the URL address based at least in part on the combined result.

11. The non-transitory machine readable storage medium of claim 10, wherein the first transformer model is fine-tuned for web-address phishing detection and the second transformer model is fine-tuned for web content data phishing detection.

12. The non-transitory machine readable storage medium of claim 10, comprising instructions that, when executed, cause processor circuitry to at least:
convert ones of groups of characters included in the at least a portion of the URL address into one or more URL address tokens;
map ones of the one or more URL address tokens into ones of URL address positional embeddings;
create the URL address matrix from the ones of URL address positional embeddings; and
output one or more vector representations corresponding to each of the ones of groups of characters, the one or more vector representations produced from one or more of the URL address self-attention values.

13. The non-transitory machine readable storage medium of claim 10, comprising instructions that, when executed, cause processor circuitry to at least:
convert ones of groups of characters included in the web content data into one or more web content data tokens;
map ones of the one or more web content data tokens into ones of web content data positional embeddings;
create the web content data matrix from the ones of web content data positional embeddings; and
output one or more vector representations corresponding to each of the ones of groups of characters, the one or more vector representations produced from one or more of the web content data self-attention values.

14. The non-transitory machine readable storage medium of claim 10, wherein the output from the first transformer model is at least a first vector representation including the URL address self-attention values of each of one or more groups of characters in the URL address matrix, and wherein the output from the second transformer model is at least a second vector representation including the web content data self-attention values of each of one or more groups of characters in the web content data matrix.

15. The non-transitory machine readable storage medium of claim 14, wherein to perform data fusion includes to concatenate the second vector representation to the first vector representation to create the combined result.

16. The non-transitory machine readable storage medium of claim 15, comprising instructions that, when executed, cause processor circuitry to at least:
train at least one of the first or second transformer models with training input data that includes at least one of the first vector representation, the second vector representation, the URL address matrix, the web content data matrix, or the combined result.

17. The non-transitory machine readable storage medium of claim 10, wherein the combined result is a first combined result, and comprising instructions that, when executed, cause processor circuitry to at least:
cluster ones of combined results including the first combined result into at least a multi-dimensional t-distributed stochastic neighbor embedding density plot, the ones of combined results corresponding to ones of outputs of the first transformer model and ones of outputs of the second transformer model.

18. The non-transitory machine readable storage medium of claim 10, comprising instructions that, when executed, cause processor circuitry to at least:
compare the combined result to a threshold value to determine whether phishing is detected.

19. A method, comprising:
providing a uniform resource locator (URL) address matrix corresponding to at least a portion of a URL address to a first transformer model, the first transformer model to calculate URL address self-attention values of URL address positional embeddings in the URL address matrix;
providing a web content data matrix corresponding to web content data on a web page at the URL address to a second transformer model, the first transformer model to calculate web content data self-attention values of web content data positional embeddings in the web content data matrix, the second transformer model different than the first transformer model;
performing data fusion on an output from the first transformer model and an output from the second transformer model to create a combined result; and
determining at least whether phishing is detected at the URL address based at least in part on the combined result.

20. The method of claim 19, wherein the first transformer model is fine-tuned for web-address phishing detection and the second transformer model is fine-tuned for web content data phishing detection.

21. The method of claim 19, further including:
converting ones of groups of characters included in the at least portion of the URL address into one or more URL address tokens;
mapping ones of the one or more URL address tokens into ones of the URL address positional embeddings;
creating the URL address matrix from the ones of the URL address positional embeddings; and
outputting one or more vector representations corresponding to each of the ones of groups of characters, the one or more vector representations produced from one or more of the URL address self-attention values.

22. The method of claim 19, further including:
converting ones of groups of characters included in the web content data into one or more web content data tokens;
mapping ones of the one or more web content data tokens into ones of the web content data positional embeddings;
creating the web content data matrix from the ones of web content data positional embeddings; and
outputting one or more vector representations corresponding to each of the ones of groups of characters, the one or more vector representations produced from one or more of the web content data self-attention values.

23. The method of claim 19, wherein the output from the first transformer model is at least a first vector representation including the URL address self-attention values of each of one or more groups of characters in the URL address matrix, and wherein the output from the second transformer model is at least a second vector representation including the web content data self-attention values of each of one or more groups of characters in the web content data matrix.

24. The method of claim 23, further including concatenating the second vector representation to the first vector representation to create the combined result.

25. The method of claim 19, further including:
comparing the combined result to a threshold value to determine whether phishing is detected.

* * * * *